United States Patent
Lv et al.

(10) Patent No.: US 10,880,543 B2
(45) Date of Patent: Dec. 29, 2020

(54) IMAGE PREDICTION METHOD AND DEVICE

(71) Applicants: Huawei Technologies Co., Ltd., Shenzhen (CN); University of Science and Technology of China, Hefei (CN)

(72) Inventors: Zhuoyi Lv, Shenzhen (CN); Li Li, Hefei (CN); Houqiang Li, Hefei (CN); Haitao Yang, Shenzhen (CN)

(73) Assignees: Huawei Technologies Co., Ltd., Shenzhen (CN); University of Science and Technology of China, Hefei (CN)

(*) Notice: Subject to any disclaimer, the term of this patent is extended or adjusted under 35 U.S.C. 154(b) by 47 days.

(21) Appl. No.: 15/906,418

(22) Filed: Feb. 27, 2018

(65) Prior Publication Data
US 2018/0192047 A1 Jul. 5, 2018

Related U.S. Application Data

(63) Continuation of application No. PCT/CN2015/100091, filed on Dec. 31, 2015.

(30) Foreign Application Priority Data
Aug. 29, 2015 (CN) .......................... 2015 1 0543542

(51) Int. Cl.
*H04N 19/105* (2014.01)
*H04N 19/54* (2014.01)
(Continued)

(52) U.S. Cl.
CPC ......... *H04N 19/105* (2014.11); *H04N 19/139* (2014.11); *H04N 19/172* (2014.11);
(Continued)

(58) Field of Classification Search
CPC combination set(s) only.
See application file for complete search history.

(56) References Cited

U.S. PATENT DOCUMENTS

2005/0249426 A1* 11/2005 Badawy ............... H04N 19/527
382/241
2006/0215761 A1 9/2006 Shi et al.
(Continued)

FOREIGN PATENT DOCUMENTS

CN 103026707 A 4/2013
CN 104363451 A 2/2015
(Continued)

OTHER PUBLICATIONS

By "Adaptive Motion Model Selection Using a Cubic Spline Based Estimation Framework", Wiegand et al., Proceedings of 2010 IEEE 17th International Conference on Image Processing, Sep. 26-29, 2010, Hong Kong.*
(Continued)

*Primary Examiner* — Janese Duley
(74) *Attorney, Agent, or Firm* — Leydig, Voit & Mayer, Ltd.

(57) ABSTRACT

An image prediction method and device are disclosed. The method includes: obtaining a first reference unit of an image unit, where respective predicted images are obtained for the image unit and the first reference unit by using a same affine model; obtaining motion information of basic motion compensation units at two or more preset positions in the first reference unit; and obtaining motion information of a basic motion compensation unit of the image unit according to the motion information. In this way, motion information of the first reference unit using a same affine motion prediction model is reused, and a more accurate motion vector of a current image unit is obtained, improving prediction accu-
(Continued)

racy and maintaining encoding and decoding complexity, thereby improving encoding and decoding performance.

38 Claims, 5 Drawing Sheets

(51) Int. Cl.
    *H04N 19/527*     (2014.01)
    *H04N 19/176*     (2014.01)
    *H04N 19/139*     (2014.01)
    *H04N 19/172*     (2014.01)
    *H04N 19/52*     (2014.01)

(52) U.S. Cl.
    CPC ........... *H04N 19/176* (2014.11); *H04N 19/52* (2014.11); *H04N 19/527* (2014.11); *H04N 19/54* (2014.11)

(56) References Cited

U.S. PATENT DOCUMENTS

| | | | |
|---|---|---|---|
| 2008/0240247 | A1 | 10/2008 | Lee et al. |
| 2010/0246976 | A1 | 9/2010 | Tolstaya |
| 2013/0121416 | A1 | 5/2013 | He et al. |
| 2017/0188041 | A1 | 6/2017 | Li et al. |
| 2017/0195685 | A1 | 7/2017 | Chen et al. |
| 2017/0214932 | A1* | 7/2017 | Huang .................. H04N 19/52 |
| 2018/0070102 | A1 | 3/2018 | Zhang et al. |
| 2018/0220149 | A1* | 8/2018 | Son ...................... H04N 19/105 |
| 2018/0234697 | A1* | 8/2018 | Jang .................... H04N 19/124 |

FOREIGN PATENT DOCUMENTS

| | | |
|---|---|---|
| CN | 104412597 A | 3/2015 |
| CN | 104539966 A | 4/2015 |
| CN | 105163116 A | 12/2015 |
| JP | 2012010313 A | 1/2012 |
| RU | 2421814 C2 | 6/2011 |
| TW | 201352008 A | 12/2013 |
| WO | 0115456 A1 | 3/2001 |
| WO | 0237859 A2 | 5/2002 |
| WO | 2011013253 A1 | 2/2011 |
| WO | 2011053655 A2 | 5/2011 |
| WO | 2012012582 A1 | 1/2012 |
| WO | 2015099823 A1 | 7/2015 |
| WO | 2016184261 A1 | 11/2016 |

OTHER PUBLICATIONS

Video/JVET, "Algorithm Description of Joint Exploration Test Model 1 (JEM 1)", International Organization for Standardization ISO/IEC JTC1/SC29/WG11 Coding of Moving Pictures and Audio, ISO/IEC JTC1/SC29/WG11/N15790, Geneva, CH, Oct. 2015, pp. 1-27.

Huang et al., "Affine SKIP and DIRECT modes for efficient video coding", Visual Communications and Image Processing (VCIP), XP032309255, Institute of Electrical and Electronics Engineers, New York, New York (2012).

Kumar et al.,"Global motion estimation in frequency and spatial domain," Acoustics, Speech, and Signal Processing 2004.Proceedings. (ICASSP'04).IEEE International Conference on Montreal, 17-21 pp. 333-336, XP010718194, Institute of Electrical and Electronics Engineers, New York, New York (2004).

Kordasiewicz et al., "Affine Motion Prediction Based on Translational Motion Vectors," IEEE Transactions on Circuits and Systems for Video Technology, vol. 17, No. 10, pp. 1388-1394, IEEE—Institute of Electrical and Electronics Engineers, New York, New York (Oct. 2007).

Huang et al., "Control-Point Representation and Differential Coding Affine-Motion Compensation," Circuits and Systems for Video Technology, vol. 23, No. 10, pp. 1651-1660, IEEE—Institute of Electrical and Electronics Engineers, New York, New York (Oct. 2013).

Li et al., "An Affine Motion Compensation Framework for High Efficiency Video Coding," 2015 IEEE International Symposium on Circuits and Systems (ISCAS), pp. 525-528, Institute of Electrical and Electronics Engineers, New York, New York (May 24-27, 2015).

Huang et al. "Control-Point Representation and Differential Coding Affine-Motion Compensation," IEEE Transactions on Circuits and Systems for Video Technology, vol. 23, No. 10, pp. 1651-1660, Institute of Electrical and Electronics Engineers, New York, New York (Oct. 2013).

"Joint Call for Proposals on Video Compression Technology," ITU—Telecommunications Standardization Secor, Study Group 16 Question 6, Video Coding Experts Group (VCEG), 39th Meeting: Kyoto, Japan, Document VCEG-AM91, International Telecommunications Union, Geneva, Switzerland (Jan. 17-22, 2010).

Huang "Research on Inter/Intra Prediction and Optimization Techniques in HEVC," Beijing Jiaotong University, CNKI, (Jun. 2014).

"Series H: Audiovisual and Multimedia Systems, Infrastructure of audiovisual services—Coding of moving video, High efficiency video coding," ITU-T H165, total 317 pages, Geneva, Switzerland (Apr. 2013).

Mathew et al., "Quad-Tree Motion Modeling With Leaf Merging", IEEE Transactions on Circuits and Systems for Video Technology, vol. 20, No. 10, XP011318748, pp. 1331-1345, Institute of Electrical and Electronics Engineers, New York, New York (Oct. 2010).

* cited by examiner

IMAGE PREDICTION METHOD AND DEVICE

CROSS-REFERENCE TO RELATED APPLICATIONS

This application is a continuation of International Application No. PCT/CN2015/100091, filed on Dec. 31, 2015, which claims priority to Chinese Patent Application No. 201510543542.8, filed on Aug. 29, 2015. The disclosures of the aforementioned applications are hereby incorporated by reference in their entireties.

STATEMENT OF JOINT RESEARCH AGREEMENT

The claimed invention was made by or on the behalf of Huawei Technologies Co., Ltd., of Shenzhen, Guangdong Province, P.R. China and University of Science and Technology of China, of Hefei, Anhui Province, P.R. China, under a joint research agreement titled "Research and Development of Next Generation Video Coding Standards and Technologies." The joint research agreement was in effect on or before the claimed invention was made, and that the claimed invention was made as a result of activities undertaken within the scope of the joint research agreement.

TECHNICAL FIELD

The present application relates to the field of video image processing, and in particular, to an image prediction method and device.

BACKGROUND

With rapid development of Internet technologies and increasing richness of people's material and spiritual culture, there are increasing demands on the Internet for application of videos, especially for application of high-definition videos. However, a high-definition video has a very large amount of data. To transmit a high-definition video on the Internet with a limited bandwidth, the first problem that needs to be resolved is compression and coding of the high-definition video. Currently, there are two international organizations dedicated to development of video coding standards, that is, the Moving Picture Experts Group (MPEG) of the International Organization for Standardization (ISO)/International Electrotechnical Commission (IEC) and the Video Coding Experts Group (VCEG) of the International Telecommunication Union-Telecommunication Standardization Sector (ITU-T). The MPEG established in 1986 is responsible for developing related standards in the field of multimedia, which are mainly applied to storage, broadcast television, streaming media on the Internet or wireless networks, and the like. The ITU-T mainly develops video coding standards for the field of real-time video communication, such as videotelephony, video conferences, or other applications.

In the past decades, international video coding standards for various applications have been successfully developed, mainly including: the MPEG-1 standard for video compact discs (VCD), the MPEG-2 standard for digital video disc (DVD) and digital video broadcasting (DVB), the H.261 standard, H.263 standard, and H.264 standard for video conferences, the MPEG-4 standard that enables coding of objects in any shape, and the latest High Efficiency Video Coding (HEVC) standard.

Compared with the latest video coding standard HEVC, for a sequence including rotation and zoom motions, a motion compensation prediction technology with a motion vector field based on linear changes can significantly improve coding performance. In an existing motion compensation prediction technology based on an affine transformation, after an affine transformation parameter of an image block is obtained, a motion vector of each point in the image block needs to be calculated, and motion compensation prediction needs to be performed according to the motion vector of the point, so as to obtain a motion compensation prediction signal of each point.

An affine transformation-based motion model is a method for effectively coding rotation and zoom motions. A motion vector of each pixel in a to-be-processed image block may be derived by using motion vectors of four vertexes of the block. For motions including only rotation and zoom, an affine transformation model can be obtained by obtaining only motion vectors of any two control points in a to-be-processed image block. An affine transformation model parameter is calculated by using a motion vector of the control point, so as to obtain a motion vector of each pixel point in the current block. A rate-distortion cost of an affine motion prediction mode is compared with a rate-distortion cost of an inter-frame prediction mode in the video coding standard. If the rate-distortion cost of the affine motion prediction mode is smaller, the affine motion prediction mode is used for coding of the to-be-processed image block. Such a block is referred to as an affine motion prediction block and a corresponding prediction unit is referred to as an affine motion prediction unit. In addition, motion information of the four vertexes of the affine motion prediction block and motion information of a center position are stored in a basic unit with a size of 4×4. A motion vector value of the center position is an average value of motion vector values of the two control points. The motion information includes a motion vector, a reference frame index, a prediction direction, and the like.

To improve coding efficiency, motion information of an adjacent block of the to-be-processed image block may be directly reused as motion information of a control point in the to-be-processed image block, without needing to further perform motion search by using a motion vector of the adjacent block as a search starting point and to code a motion vector difference, reducing bits consumed for coding the motion vector difference. Such a method has a relatively high requirement on accuracy of motion vector information of the adjacent block reused for the current block, but the accuracy of the motion vector information of the adjacent block cannot be ensured in the prior art. Consequently, the coding efficiency cannot be improved.

SUMMARY

The present application provides an image prediction method and device to improve coding efficiency.

According to a first aspect, an image prediction method is provided, including:

obtaining a first reference unit of an image unit, where respective predicted images are obtained for the image unit and the first reference unit by using a same affine model;

obtaining motion information of basic motion compensation units at two or more preset positions in the first reference unit; and obtaining motion information of a basic motion compensation unit of the image unit according to the motion information.

With reference to the first aspect, in a first possible implementation of the first aspect, the obtaining a first reference unit of an image unit includes:

checking, in preset order, whether a predicted image is obtained for a prediction unit adjacent to the image unit by using the affine model; and if the predicted image is obtained for the prediction unit adjacent to the image unit by using the affine model, stopping the checking and using the prediction unit as the first reference unit.

With reference to the first aspect, in a second possible implementation of the first aspect, the preset position is a unit corner-point position in the first reference unit.

With reference to any one of the first aspect, the first possible implementation of the first aspect, or the second possible implementation of the first aspect, in a third possible implementation of the first aspect, the obtaining motion information of basic motion compensation units at two or more preset positions in the first reference unit includes:

obtaining motion information of basic motion compensation units at three preset positions in the first reference unit; and correspondingly, the obtaining motion information of a basic motion compensation unit of the image unit according to the motion information includes:

obtaining a prediction direction, a reference frame index, and a motion vector of the basic motion compensation unit of the image unit according to prediction directions, reference frame indexes, and motion vectors of the basic motion compensation units at the three preset positions in the first reference unit.

With reference to the third possible implementation of the first aspect, in a fourth possible implementation of the first aspect, the obtaining a prediction direction, a reference frame index, and a motion vector of the basic motion compensation unit of the image unit according to prediction directions, reference frame indexes, and motion vectors of the basic motion compensation units at the three preset positions in the first reference unit includes:

assigning a same prediction direction to the basic motion compensation unit of the image unit and the basic motion compensation units at the three preset positions in the first reference unit;

assigning a same reference frame index to the basic motion compensation unit of the image unit and the basic motion compensation units at the three preset positions in the first reference unit; and obtaining the motion vector of the basic motion compensation unit of the image unit by means of interpolation according to the motion vectors of the basic motion compensation units at the three preset positions in the first reference unit.

With reference to the fourth possible implementation of the first aspect, in a fifth possible implementation of the first aspect, the obtaining the motion vector of the basic motion compensation unit of the image unit by means of interpolation according to the motion vectors of the basic motion compensation units at the three preset positions in the first reference unit is implemented in the following manner:

$$vx = ax - by - e$$
$$vy = cx - dy - f$$

-continued
$$a = \frac{(x_1 - x_2)(y_1 - y_2)(vx_1 - vx_3) - (x_1 - x_2)(y_1 - y_3)(vx_1 - vx_2)}{(x_1 - x_2)(x_1 - x_3)(y_1 - y_2) - (x_1 - x_2)^2(y_1 - y_3)}$$

$$b = \frac{(x_1 - x_2)(vx_1 - vx_3) - (x_1 - x_3)(vx_1 - vx_2)}{(x_1 - x_3)(y_1 - y_2) - (x_1 - x_2)(y_1 - y_3)}$$

$$c = \frac{(x_1 - x_2)(y_1 - y_2)(vy_1 - vy_3) - (x_1 - x_2)(y_1 - y_3)(vy_1 - vy_2)}{(x_1 - x_2)(x_1 - x_3)(y_1 - y_2) - (x_1 - x_2)^2(y_1 - y_3)}$$

$$d = \frac{(x_1 - x_2)(vy_1 - vy_3) - (x_1 - x_3)(vy_1 - vy_2)}{(x_1 - x_3)(y_1 - y_2) - (x_1 - x_2)(y_1 - y_3)}$$

$$e = ax_1 - by_1 - vx_1$$
$$f = cx_1 - dy_1 - vy_1$$

where x and y are respectively horizontal and vertical coordinates of the basic motion compensation unit of the image unit, vx and vy are corresponding horizontal and vertical motion vectors, $x_1$, $x_2$, and $x_3$ and $y_1$, $y_2$, and $y_3$ are respectively horizontal and vertical coordinates of the basic motion compensation units at the three preset positions in the first reference unit, and $vx_1$, $vx_2$, and $vx_3$ $vy_1$, $vy_2$, and $vy_3$ are corresponding horizontal and vertical motion vectors.

With reference to any one of the first aspect, the first possible implementation of the first aspect, or the second possible implementation of the first aspect, in a sixth possible implementation of the first aspect, the obtaining motion information of basic motion compensation units at two or more preset positions in the first reference unit includes:

obtaining motion information of basic motion compensation units at two preset positions in the first reference unit; and correspondingly, the obtaining motion information of a basic motion compensation unit of the image unit according to the motion information includes: obtaining a prediction direction, a reference frame index, and a motion vector of the basic motion compensation unit of the image unit according to prediction directions, reference frame indexes, and motion vectors of the basic motion compensation units at the two preset positions in the first reference unit.

With reference to the sixth possible implementation of the first aspect, in a seventh possible implementation of the first aspect, the obtaining a prediction direction, a reference frame index, and a motion vector of the basic motion compensation unit of the image unit according to prediction directions, reference frame indexes, and motion vectors of the basic motion compensation units at the two preset positions in the first reference unit includes:

assigning a same prediction direction to the basic motion compensation unit of the image unit and the basic motion compensation units at the two preset positions in the first reference unit;

assigning a same reference frame index to the basic motion compensation unit of the image unit and the basic motion compensation units at the two preset positions in the first reference unit; and obtaining the motion vector of the basic motion compensation unit of the image unit by means of interpolation according to the motion vectors of the basic motion compensation units at the two preset positions in the first reference unit.

With reference to the seventh possible implementation of the first aspect, in an eighth possible implementation of the first aspect, the obtaining the motion vector of the basic motion compensation unit of the image unit by means of interpolation according to the motion vectors of the basic motion compensation units at the two preset positions in the first reference unit is implemented in the following manner:

$$vx = a_2 x - a_3 y - a_0$$
$$vy = a_2 y + a_3 x - a_1$$
$$a_0 = a_2 x_2 - a_3 y_2 - vx_2$$
$$a_1 = a_2 y_2 + a_3 x_2 - vy_2$$
$$a_2 = \frac{[(x_2 - x_1)^2 + (y_2 - y_1)^2](vx_2 - vx_1) + (x_2 - x_1)(y_2 - y_1)(vy_2 - vy_1) - (vx_2 - vx_1)(y_2 - y_1)^2}{(x_2 - x_1)[(x_2 - x_1)^2 + (y_2 - y_1)^2]}$$
$$a_3 = \frac{(x_2 - x_1)(vy_2 - vy_1) - (y_2 - y_1)(vx_2 - vx_1)}{[(x_2 - x_1)^2 + (y_2 - y_1)^2]}$$

where x and y are respectively horizontal and vertical coordinates of the basic motion compensation unit of the image unit, vx and vy are corresponding horizontal and vertical motion vectors, $x_1$ and $x_2$ and $y_1$ and $y_2$ are respectively horizontal and vertical coordinates of the basic motion compensation units at the two preset positions in the first reference unit, and $vx_1$ and $vx_2$ and $vy_1$ and $vy_2$ are corresponding horizontal and vertical motion vectors.

According to a second aspect, an image prediction device is provided, including:

a first obtaining module, configured to obtain a first reference unit of an image unit, where respective predicted images are obtained for the image unit and the first reference unit by using a same affine model;

a second obtaining module, configured to obtain motion information of basic motion compensation units at two or more preset positions in the first reference unit; and a third obtaining module, configured to obtain motion information of a basic motion compensation unit of the image unit according to position information and the motion information.

With reference to the second aspect, in a first possible implementation of the second aspect, the first obtaining module is configured to:

check, in preset order, whether a predicted image is obtained for a prediction unit adjacent to the image unit by using the affine model; and if the predicted image is obtained for the prediction unit adjacent to the image unit by using the affine model, stop the checking and use the prediction unit as the first reference unit.

With reference to the second aspect, in a second possible implementation of the second aspect, the preset position is a unit corner-point position in the first reference unit.

With reference to any one of the second aspect, the first possible implementation of the second aspect, or the second possible implementation of the second aspect, in a third possible implementation of the second aspect, the third obtaining module is configured to:

obtain motion information of basic motion compensation units at three preset positions in the first reference unit; and correspondingly, the obtaining motion information of a basic motion compensation unit of the image unit according to the motion information includes:

obtaining a prediction direction, a reference frame index, and a motion vector of the basic motion compensation unit of the image unit according to prediction directions, reference frame indexes, and motion vectors of the basic motion compensation units at the three preset positions in the first reference unit.

With reference to the third possible implementation of the second aspect, in a fourth possible implementation of the second aspect, the third obtaining module is further configured to:

assign a same prediction direction to the basic motion compensation unit of the image unit and the basic motion compensation units at the three preset positions in the first reference unit;

assign a same reference frame index to the basic motion compensation unit of the image unit and the basic motion compensation units at the three preset positions in the first reference unit; and obtain the motion vector of the basic motion compensation unit of the image unit by means of interpolation according to the motion vectors of the basic motion compensation units at the three preset positions in the first reference unit.

With reference to the fourth possible implementation of the second aspect, in a fifth possible implementation of the second aspect, the obtaining the motion vector of the basic motion compensation unit of the image unit by means of interpolation according to the motion vectors of the basic motion compensation units at the three preset positions in the first reference unit is implemented in the following manner:

$$vx = ax - by - e$$
$$vy = cx - dy - f$$
$$a = \frac{(x_1 - x_2)(y_1 - y_2)(vx_1 - vx_3) - (x_1 - x_2)(y_1 - y_3)(vx_1 - vx_2)}{(x_1 - x_2)(x_1 - x_3)(y_1 - y_2) - (x_1 - x_2)^2(y_1 - y_3)}$$
$$b = \frac{(x_1 - x_2)(vx_1 - vx_3) - (x_1 - x_3)(vx_1 - vx_2)}{(x_1 - x_3)(y_1 - y_2) - (x_1 - x_2)(y_1 - y_3)}$$
$$c = \frac{(x_1 - x_2)(y_1 - y_2)(vy_1 - vy_3) - (x_1 - x_2)(y_1 - y_3)(vy_1 - vy_2)}{(x_1 - x_2)(x_1 - x_3)(y_1 - y_2) - (x_1 - x_2)^2(y_1 - y_3)}$$
$$d = \frac{(x_1 - x_2)(vy_1 - vy_3) - (x_1 - x_3)(vy_1 - vy_2)}{(x_1 - x_3)(y_1 - y_2) - (x_1 - x_2)(y_1 - y_3)}$$
$$e = ax_1 - by_1 - vx_1$$
$$f = cx_1 - dy_1 - vy_1$$

where x and y are respectively horizontal and vertical coordinates of the basic motion compensation unit of the image unit, vx and vy are corresponding horizontal and vertical motion vectors, $x_1$, $x_2$, and $x_3$ and $y_1$, $y_2$, and $y_3$ are respectively horizontal and vertical coordinates of the basic motion compensation units at the three preset positions in the first reference unit, and $vx_1$, $vx_2$, and $vx_3$ and $vy_1$, $vy_2$, and $vy_3$ are corresponding horizontal and vertical motion vectors.

With reference to any one of the second aspect, the first possible implementation of the second aspect, or the second possible implementation of the second aspect, in a sixth possible implementation of the second aspect, the third obtaining module is configured to:

obtain motion information of basic motion compensation units at two preset positions in the first reference unit; and correspondingly, the obtaining motion information of a basic motion compensation unit of the image unit according to the motion information includes:

obtaining a prediction direction, a reference frame index, and a motion vector of the basic motion compensation unit of the image unit according to prediction directions, reference frame indexes, and motion vectors of the basic motion compensation units at the two preset positions in the first reference unit.

With reference to the sixth possible implementation of the second aspect, in a seventh possible implementation of the second aspect, the third obtaining module is further configured to:

assign a same prediction direction to the basic motion compensation unit of the image unit and the basic motion compensation units at the two preset positions in the first reference unit;

assign a same reference frame index to the basic motion compensation unit of the image unit and the basic motion compensation units at the two preset positions in the first reference unit; and obtain the motion vector of the basic motion compensation unit of the image unit by means of interpolation according to the motion vectors of the basic motion compensation units at the two preset positions in the first reference unit.

With reference to the seventh possible implementation of the second aspect, in an eighth possible implementation of the second aspect, the obtaining the motion vector of the basic motion compensation unit of the image unit by means of interpolation according to the motion vectors of the basic motion compensation units at the two preset positions in the first reference unit is implemented in the following manner:

$$vx = a_2 x - a_3 y - a_0$$
$$vy = a_2 y + a_3 x - a_1$$
$$a_0 = a_2 x_2 - a_3 y_2 - vx_2$$
$$a_1 = a_2 y_2 + a_3 x_2 - vy_2$$
$$a_2 = \frac{[(x_2 - x_1)^2 + (y_2 - y_1)^2](vx_2 - vx_1) + (x_2 - x_1)(y_2 - y_1)(vy_2 - vy_1) - (vx_2 - vx_1)(y_2 - y_1)^2}{(x_2 - x_1)[(x_2 - x_1)^2 + (y_2 - y_1)^2]}$$
$$a_3 = \frac{(x_2 - x_1)(vy_2 - vy_1) - (y_2 - y_1)(vx_2 - vx_1)}{[(x_2 - x_1)^2 + (y_2 - y_1)^2]}$$

where x and y are respectively horizontal and vertical coordinates of the basic motion compensation unit of the image unit, vx and vy are corresponding horizontal and vertical motion vectors, $x_1$ and $x_2$ and $y_1$ and $y_2$ are respectively horizontal and vertical coordinates of the basic motion compensation units at the two preset positions in the first reference unit, and $vx_1$ and $vx_2$ and $vy_1$ and $vy_2$ are corresponding horizontal and vertical motion vectors.

Based on the foregoing technical solutions, according to the image prediction method and device in the embodiments of the present application, motion information of the first reference unit using a same affine motion prediction model is reused, and therefore, a more accurate motion vector of a current image unit is obtained without encoding and decoding a motion vector difference and without extra searching for a high-precision motion vector. In this way, prediction accuracy is improved and encoding and decoding complexity are maintained, thereby improving encoding and decoding performance.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
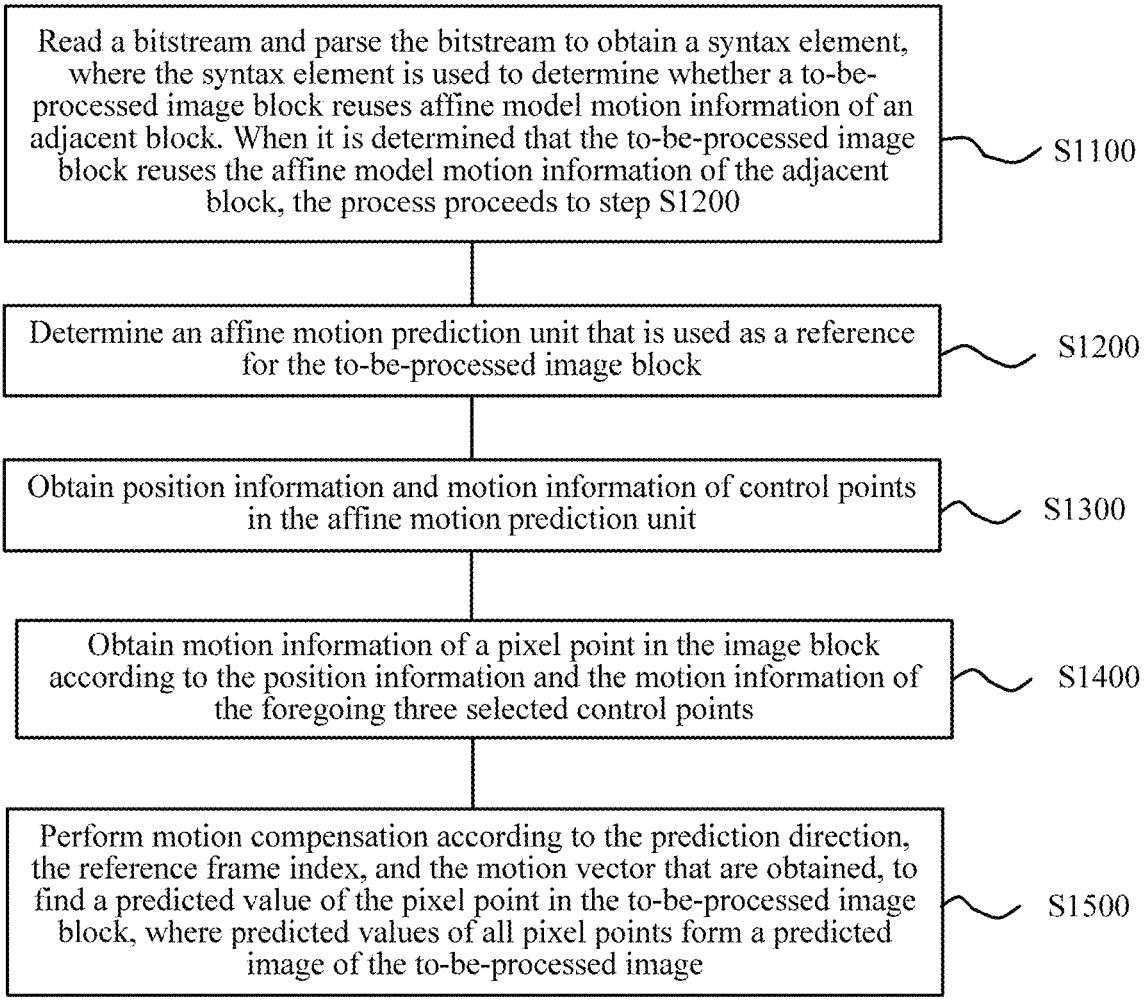
FIG. 1 is a schematic flowchart of an image prediction method according to an embodiment of the present application.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

It should be understood that, in the embodiments of the present application, a rotation and zoom affine model based on two control points in each prediction unit (four parameters) is used, or a rotation and zoom affine model based on three control points in each prediction unit (six parameters) may be used, or a perspective affine model based on four control points in each prediction unit (eight parameters) or the like may be used, and no limitation is imposed thereon.

It should be understood that, a basic motion compensation unit is a minimum unit for performing motion compensation, and the unit has uniform motion information. In the embodiments of the present application, a pixel point is used as a basic motion compensation unit, or a pixel matrix or the like may be used as a basic motion compensation unit, and no limitation is imposed thereon.

It should be understood that, in a 4-parameter affine model, from motion information of any two basic motion compensation units, motion information of all motion compensation units in an affine motion prediction unit in which the two basic motion compensation units are located may be interpolated. Preferably, more accurate interpolation motion information may be obtained by selecting basic motion compensation units in any two unit corner-points in the affine motion prediction unit. A position of the unit corner-point is a point at which two adjacent sides of the affine motion prediction unit, that is, a first reference unit, converge. For example, if the affine motion prediction unit is a triangle, unit corner-points are three vertexes of the triangle; if the affine motion prediction unit is a quadrangle, unit corner-points are four vertexes of the quadrangle, and so on. In the embodiments, for ease of description, basic motion compensation units from which the motion information of all the motion compensation units in the affine motion prediction unit is interpolated are referred to as control points.

An embodiment of the present application provides an image prediction method, which is implemented by a decoder. The method specifically includes the following steps:

obtaining a first reference unit of an image unit, where respective predicted images are obtained for the image unit and the first reference unit by using a same affine model;

obtaining motion information of basic motion compensation units at two or more preset positions in the first reference unit; and obtaining motion information of a basic motion compensation unit of the image unit according to the motion information.

According to the image prediction method and device in this embodiment of the present application, motion information of the first reference unit using a same affine motion prediction model is reused, and therefore, a more accurate motion vector of a current image unit is obtained without encoding and decoding a motion vector difference and without extra searching for a high-precision motion vector. In this way, prediction accuracy is improved and encoding and decoding complexity are maintained, thereby improving encoding and decoding performance.

Preferably, the preset position is a unit corner-point position in the first reference unit, and the corner-point position is a point at which two adjacent sides of the first reference unit converge.

Preferably, for example, the obtaining motion information of basic motion compensation units at two or more preset positions in the first reference unit includes:

obtaining motion information of basic motion compensation units at three preset positions in the first reference unit; and correspondingly, the obtaining motion information of a basic motion compensation unit of the image unit according to the motion information includes: obtaining a prediction direction, a reference frame index, and a motion vector of the basic motion compensation unit of the image unit according to prediction directions, reference frame indexes, and motion vectors of the basic motion compensation units at the three preset positions in the first reference unit.

The obtaining a prediction direction, a reference frame index, and a motion vector of the basic motion compensation unit of the image unit according to prediction directions, reference frame indexes, and motion vectors of the basic motion compensation units at the three preset positions in the first reference unit may be:

assigning a same prediction direction to the basic motion compensation unit of the image unit and the basic motion compensation units at three preset positions in the first reference unit; assigning a same reference frame index to the basic motion compensation unit of the image unit and the basic motion compensation units at the three preset positions in the first reference unit; and obtaining the motion vector of the basic motion compensation unit of the image unit by means of interpolation according to the motion vectors of the basic motion compensation units at the three preset positions in the first reference unit.

The obtaining the motion vector of the basic motion compensation unit of the image unit by means of interpolation according to the motion vectors of the basic motion compensation units at the three preset positions in the first reference unit is implemented in the following manner:

$$vx = ax - by - e$$

$$vy = cx - dy - f$$

$$a = \frac{(x_1 - x_2)(y_1 - y_2)(vx_1 - vx_3) - (x_1 - x_2)(y_1 - y_3)(vx_1 - vx_2)}{(x_1 - x_2)(x_1 - x_3)(y_1 - y_2) - (x_1 - x_2)^2(y_1 - y_3)}$$

$$b = \frac{(x_1 - x_2)(vx_1 - vx_3) - (x_1 - x_3)(vx_1 - vx_2)}{(x_1 - x_3)(y_1 - y_2) - (x_1 - x_2)(y_1 - y_3)}$$

$$c = \frac{(x_1 - x_2)(y_1 - y_2)(vy_1 - vy_3) - (x_1 - x_2)(y_1 - y_3)(vy_1 - vy_2)}{(x_1 - x_2)(x_1 - x_3)(y_1 - y_2) - (x_1 - x_2)^2(y_1 - y_3)}$$

$$d = \frac{(x_1 - x_2)(vy_1 - vy_3) - (x_1 - x_3)(vy_1 - vy_2)}{(x_1 - x_3)(y_1 - y_2) - (x_1 - x_2)(y_1 - y_3)}$$

$$e = ax_1 - by_1 - vx_1$$

$$f = cx_1 - dy_1 - vy_1,$$

where x and y are respectively horizontal and vertical coordinates of the basic motion compensation unit of the image unit, vx and vy are corresponding horizontal and vertical motion vectors, $x_1$, $x_2$, and $x_3$ and $y_1$, $y_2$, and $y_3$ are respectively horizontal and vertical coordinates of the basic motion compensation units at the three preset positions in the first reference unit, and $vx_1$, $vx_2$, and $vx_3$ and $vy_1$, $vy_2$, and $vy_3$ are corresponding horizontal and vertical motion vectors.

The foregoing formulas that are used to obtain the motion vector of the basic motion compensation unit of the image unit by means of interpolation are common formulas that are used to complete interpolation according to motion information of basic motion compensation units at any selected preset positions in the first reference unit. In a specific embodiment, the formulas may be simplified for different application scenarios according to particularity of selected preset positions. For example, in a specific embodiment of the present application, top left, bottom left, and top right unit corner-points in the unit are selected as the preset positions, and the formulas are simplified to:

$$vx = \frac{vx_3 - vx_2}{x_3 - x_2}x + \frac{vx_4 - vx_2}{y_4 - y_2}y + vx_2$$

$$vy = \frac{vy_3 - vy_2}{x_3 - x_2}x + \frac{vy_4 - vy_2}{y_4 - y_2}y + vy_2$$

where x and y are respectively horizontal and vertical coordinates of a pixel point in a to-be-processed image block, vx and vy are corresponding horizontal and vertical motion vectors, $x_1$, $x_2$, and $x_3$ and $y_1$, $y_2$, and $y_3$ are respectively horizontal and vertical coordinates of three control points in an affine motion prediction unit, and $vx_1$, $vx_2$, and $vx_3$ and $vy_1$, $vy_2$, and $vy_3$ are corresponding horizontal and vertical motion vectors.

Alternatively, for example, the method includes:

obtaining motion information of basic motion compensation units at two preset positions in the first reference unit; and correspondingly, the obtaining motion information of a basic motion compensation unit of the image unit according to the motion information includes: obtaining a prediction direction, a reference frame index, and a motion vector of the basic motion compensation unit of the image unit according to prediction directions, reference frame indexes, and motion vectors of the basic motion compensation units at the two preset positions in the first reference unit.

The obtaining the motion vector of the basic motion compensation unit of the image unit by means of interpolation according to the motion vectors of the basic motion compensation units at the two preset positions in the first reference unit is implemented in the following manner:

$$vx = a_2 x - a_3 y - a_0$$

$$vy = a_2 y + a_3 x - a_1$$

$$a_0 = a_2 x_2 - a_3 y_2 - vx_2$$

$$a_1 = a_2 y_2 + a_3 x_2 - vy_2$$

$$a_2 = \frac{[(x_2 - x_1)^2 + (y_2 - y_1)^2](vx_2 - vx_1) + (x_2 - x_1)(y_2 - y_1)(vy_2 - vy_1) - (vx_2 - vx_1)(y_2 - y_1)^2}{(x_2 - x_1)[(x_2 - x_1)^2 + (y_2 - y_1)^2]}$$

$$a_3 = \frac{(x_2 - x_1)(vy_2 - vy_1) - (y_2 - y_1)(vx_2 - vx_1)}{[(x_2 - x_1)^2 + (y_2 - y_1)^2]}$$

where x and y are respectively horizontal and vertical coordinates of the basic motion compensation unit of the image unit, vx and vy are corresponding horizontal and vertical motion vectors, $x_1$ and $x_2$ and $y_1$ and $y_2$ are respectively horizontal and vertical coordinates of the basic motion compensation units at the two preset positions in the first reference unit, and $vx_1$ and $vx_2$ and $vy_1$ and $vy_2$ are corresponding horizontal and vertical motion vectors.

The foregoing formulas that are used to obtain the motion vector of the basic motion compensation unit of the image unit by means of interpolation are common formulas that are used to complete interpolation according to motion information of basic motion compensation units at any selected preset positions in the first reference unit. In a specific embodiment, the formulas may be simplified for different application scenarios according to particularity of selected preset positions. For example, in a specific embodiment of the present application, top left and top right unit cornerpoints in the unit are selected as the preset positions, and the formulas are simplified to:

$$vx = \frac{vx_1 - vx_0}{x_1 - x_0} \times x - \frac{vy_1 - vy_0}{x_1 - x_0} \times y + vx_0$$

$$vy = \frac{vy_1 - vy_0}{x_1 - x_0} \times x + \frac{vx_1 - vx_0}{x_1 - x_0} \times y + vy_0$$

where x and y are respectively horizontal and vertical coordinates of a pixel point in a to-be-processed image block, vx and vy are corresponding horizontal and vertical motion vectors, and $x_0$ and $x_1$ and $y_0$ and $y_1$ are respectively horizontal and vertical coordinates of two control points in an affine motion prediction unit, where $y_0$ is equal to $y_1$, and $vx_0$ and $vx_1$ and $vy_0$ and $vy_1$ are corresponding horizontal and vertical motion vectors.

In addition, the present application further provides an image prediction method applied to an encoding process. The image prediction method applied to an encoding process is the same as the foregoing image prediction method applied to a decoding process. Therefore, a same effect of improving encoding performance may be obtained.

The following describes specific implementations of the present application by using specific examples.

FIG. 1 is a schematic flowchart of an image prediction method according to an embodiment of the present application. The method shown in FIG. 1 may be performed by a decoding device, such as a decoder.

Specifically, as shown in FIG. 1, the method 1000 includes the following steps.

S1100. Read a bitstream and parse the bitstream to obtain a syntax element, where the syntax element is used to determine whether a to-be-processed image block reuses affine model motion information of an adjacent block. When it is determined that the to-be-processed image block reuses the affine model motion information of the adjacent block, the process proceeds to step S1200.

S1200. Determine an affine motion prediction unit that is used as a reference for the to-be-processed image block.

A first specific implementation method 1210 of the step includes the following steps:

S1211. Determine a set of candidate prediction units for the to-be-processed image block.

Figure 2:
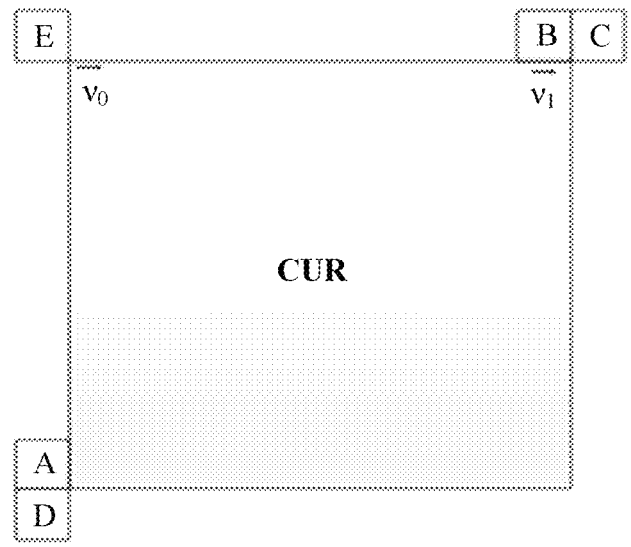
FIG. 2 is a schematic diagram of candidate prediction units according to an embodiment of the present application.

As shown in FIG. 2, in this embodiment of the present application, prediction units in which 4×4 blocks at five positions A, B, C, D, and E that are spatially adjacent to the to-be-processed image block are respectively located are selected to form the set. It should be understood that, alternatively, some of the positions A, B, C, D, and E may be selected, or prediction units in which other blocks adjacent in time domain to the to-be-processed image block are located may be selected to form the set, and no limitation is imposed thereon.

S1212. Check, in preset order, whether a prediction unit in the set is an affine motion prediction unit.

The preset order is an order that is predetermined in a protocol by encoding and decoding sides and is maintained consistent between the encoding and decoding sides. In this embodiment of the present application, the preset order is A, B, C, D, and E. It should be understood that, alternatively, the preset order may be B, D, A, E, and C, or another order, and no limitation is imposed thereon.

S1213. If it is found that the prediction unit is an affine motion prediction unit, stop checking and use the prediction unit as the affine motion prediction unit referred by the to-be-processed image block.

A second specific implementation method 1220 of the step includes the following steps.

S1221. Determine a set of candidate prediction units for a to-be-processed image block.

In addition to the same set determining manner as that in S1211, the method may further include: removing a non-affine motion prediction unit in the set from the set. For example, the set determined by using the determining manner of S1211 includes the prediction units in which A, B, C, D, and E are located, and prediction units in which C and D are located are not affine motion prediction units. Therefore, C and D are removed from the set, and the determined set of candidate prediction units includes prediction units in which A, B and E are located.

Alternatively, the method may include: limiting a capacity of the set, and removing, from the set, a candidate prediction unit whose checking order ranks behind an allowable quantity of candidate prediction units. For example, the quantity of candidate prediction units in the set is set to a maximum of 2, and a set that is with a checking order and that is determined by using the determining manner of S1211 according to the checking order of S1212 is A, D, C, E, and B. Therefore, C, E, and B are removed from the set, and the determined set of candidate prediction units includes prediction units in which A and D are located. It should be understood that, the capacity of the set may be set to 3 or 4, or may not be limited if the capacity falls within a range that is greater than 0 but less than or equal to a maximum quantity of candidate prediction units determined by using the determining manner of S1211.

Alternatively, the foregoing two set determining manners may be used in combination.

S1222. Read the bitstream and parse the bitstream to obtain a syntax element, where the syntax element is used to indicate index information of the affine motion prediction unit that is in the set of candidate prediction units and that is used as a reference for the to-be-processed image block.

S1223. Determine, according to the index information, an affine motion prediction unit that is used as a reference for the to-be-processed image block.

For example, if the set of candidate prediction units includes two candidate prediction units A and B, an index of A is 0 and an index of B is 1. The bitstream is read and is parsed to obtain the index information. If the index information is 0, the affine motion prediction unit referred by the to-be-processed image block is a prediction unit in which A is located; If the index information is 1, the affine motion prediction unit referred by the to-be-processed image block is a prediction unit in which B is located.

S1300. Obtain position information and motion information of control points in the affine motion prediction unit.

A first specific implementation method 1310 of the step includes: selecting any three control points from four control points in the affine motion prediction unit, and obtaining position information, motion vector information, prediction directions, and reference frame indexes of the three control points. Because all pixel points in a same affine motion prediction unit have a same prediction direction and a same reference frame index, the prediction directions and the reference frame indexes of all the control points are also the same.

A second specific implementation method 1320 of the step includes: selecting any two control points, which may be referred to as first and second control points, from four control points in the affine motion prediction unit, and obtaining position information, motion vector information, prediction directions, and reference frame indexes of the two control points; and then selecting any control point, which may be referred to as a third control point, from the remaining two control points, and obtaining position information of the third control point. Motion vector information of the third control point may be derived according to the first and second control points in the following manner:

$$vx = \frac{vx_1 - vx_2}{x_1 - x_2} \times x - \frac{vy_1 - vy_2}{x_1 - x_2} \times y + vx_2$$
$$vy = \frac{vy_1 - vy_2}{x_1 - x_2} \times x + \frac{vx_1 - vx_2}{x_1 - x_2} \times y + vy_2$$

where x and y are respectively horizontal and vertical coordinates of the third control point, vx and vy are corresponding horizontal and vertical motion vectors, $x_1$ and $x_2$ and $y_1$ and $y_2$ are respectively horizontal and vertical coordinates of the first and second control points, and $vx_1$ and $vx_2$ and $vy_1$ and $vy_2$ are corresponding horizontal and vertical motion vectors.

Because all pixel points in a same affine motion prediction unit have a same prediction direction and a same reference frame index, the prediction directions and the reference frame indexes of all the control points are also the same. The third control point has a same prediction direction and reference frame index as those of the first and second control points.

According to either of the foregoing two specific implementations, after step S1300, motion information and position information of at least three control points are obtained.

Figure 3:
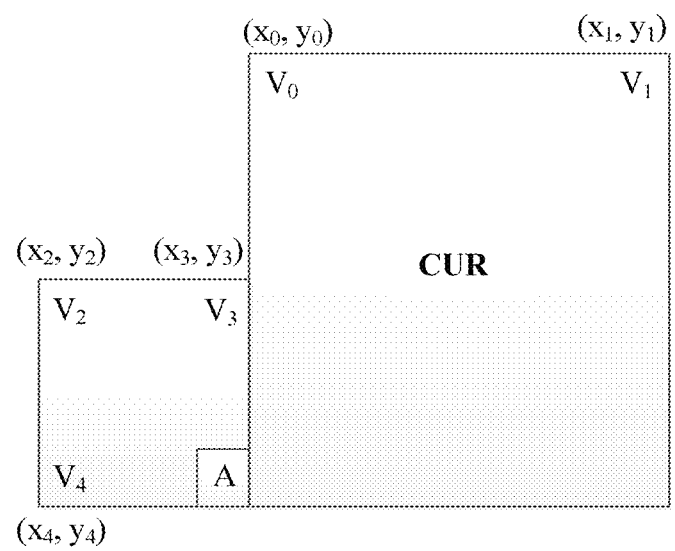
FIG. 3 is a schematic diagram of an affine image block and control points according to an embodiment of the present application.

As shown in FIG. 3, in this embodiment of the present application, control points represented by three vertexes: top left ($x_2$, $y_2$), top right ($x_3$, $y_3$), and bottom left ($x_4$, $y_4$) vertexes of an affine motion prediction unit in which an adjacent block A of the to-be-processed image block is located are selected. In this embodiment, $x_2$ is equal to $x_4$, and $y_2$ is equal to $y_3$.

It should be understood that, the control point is randomly selected, and no limitation is imposed thereon.

S1400. Obtain motion information of a pixel point in the image block according to the position information and the motion information of the foregoing three selected control points.

A first specific implementation method 1410 of the step includes the following steps:

S1411. Because the prediction directions and the reference frame indexes of all the control points are the same, the prediction direction and the reference frame index of any one of the control points are assigned to the pixel point in the to-be-processed image block. Alternatively, the bitstream may be parsed to obtain reference frame information of the to-be-processed image block, where the reference frame information includes a prediction direction and a reference frame index.

S1412. Obtain, according to the position information and motion vectors obtained in S1300 of the any three control points, a motion vector of the pixel point in the to-be-processed image block. This is implemented in the following manner:

$$vx = \frac{vx_3 - vx_2}{x_3 - x_2}x + \frac{vx_4 - vx_2}{y_4 - y_2}y + vx_2$$
$$vy = \frac{vy_3 - vy_2}{x_3 - x_2}x + \frac{vy_4 - vy_2}{y_4 - y_2}y + vy_2$$

where x and y are respectively horizontal and vertical coordinates of the pixel point in the to-be-processed image block, vx and vy are corresponding horizontal and vertical motion vectors, $x_1$, $x_2$, and $x_3$ and $y_1$, $y_2$, and $y_3$ are respectively horizontal and vertical coordinates of the any three control points in the affine motion prediction unit, and $vx_1$, $vx_2$, $vx_3$ and $vy_1$, $vy_2$, and $vy_3$ are corresponding horizontal and vertical motion vectors.

A second specific implementation method 1420 of the step includes the following steps.

S1421. Because the prediction directions and the reference frame indexes of all the control points are the same, the prediction direction and the reference frame index of any one of the control points are assigned to the pixel point in the to-be-processed image block. Alternatively, the bitstream may be parsed to obtain reference frame information of the to-be-processed image block, where the reference frame information includes a prediction direction and a reference frame index.

S1422. As shown in FIG. 3, obtain, according to the position information and motion vectors obtained in S1300 of the any three control points, motion vectors of any two control points in the to-be-processed image block. This is implemented in the following manner:

$$vx_0 = vx_3 + \frac{(y_0 - y_3) \times (vx_4 - vx_2)}{(y_4 - y_2)}, \quad vy_0 = vy_3 + \frac{(y_0 - y_3) \times (vy_4 - vy_2)}{(y_4 - y_2)}$$

$$vx_1 = vx_0 + \frac{(x_1 - x_0) \times (vx_3 - vx_2)}{(x_3 - x_2)}, \quad vy_1 = vy_0 + \frac{(x_1 - x_0) \times (vy_3 - vy_2)}{(x_3 - x_2)}$$

where $x_0$ and $x_1$ and $y_0$ and $y_1$ are respectively horizontal and vertical coordinates of the two control points in the to-be-processed image block, $y_0$ is equal to $y_1$, $vx_0$ and $vx_1$ and $vy_0$ and $vy_1$ are corresponding horizontal and vertical motion vectors, $x_2$, $x_3$ and $x_4$ and $y_2$, $y_3$, and $y_4$ are respectively horizontal and vertical coordinates of the three control points in the affine motion prediction unit, and $vx_2$, $vx_3$, and $x_4$ and $vy_2$, $vy_3$, $vy_4$ and are corresponding horizontal and vertical motion vectors.

S1423. Obtain, according to the motion vectors obtained in S1422 of the two control points, a motion vector of the pixel point in the to-be-processed image block. This is implemented in the following manner:

$$vx = \frac{vx_1 - vx_0}{x_1 - x_0} \times x - \frac{vy_1 - vy_0}{x_1 - x_0} \times y + vx_0$$

$$vy = \frac{vy_1 - vy_0}{x_1 - x_0} \times x + \frac{vx_1 - vx_0}{x_1 - x_0} \times y + vy_0$$

where x and y are respectively horizontal and vertical coordinates of the pixel point in the image block, vx and vy are corresponding horizontal and vertical motion vectors, and $x_0$ and $x_1$ and $y_0$ and $y_1$ are respectively horizontal and vertical coordinates of two control points in the to-be-processed image block, where $y_0$ is equal to $y_1$, and $vx_0$ and $vx_1$ and $vy_0$ and $vy_1$ are corresponding horizontal and vertical motion vectors.

A third specific implementation method 1430 of the step includes the following steps.

S1431. Because the prediction directions and the reference frame indexes of all the control points are the same, the prediction direction and the reference frame index of any one of the control points are assigned to the pixel point in the to-be-processed image block. Alternatively, the bitstream may be parsed to obtain reference frame information of the to-be-processed image block, where the reference frame information includes a prediction direction and a reference frame index.

S1432. As shown in FIG. 3, obtain, according to the position information and the motion vectors obtained in S1400 of the any three control points, motion vectors of any two control points in the to-be-processed image block. This is implemented in the following manner:

$$vx_0 = vx_3 + \frac{(y_0 - y_3) \times (vx_4 - vx_2)}{(y_4 - y_2)}, \quad vy_0 = vy_3 + \frac{(y_0 - y_3) \times (vy_4 - vy_2)}{(y_4 - y_2)}$$

$$vx_1 = vx_0 + \frac{(x_1 - x_0) \times (vx_3 - vx_2)}{(x_3 - x_2)}, \quad vy_1 = vy_0 + \frac{(x_1 - x_0) \times (vy_3 - vy_2)}{(x_3 - x_2)}$$

where $x_0$ and $x_1$ and $y_0$ and $y_1$ are respectively horizontal and vertical coordinates of the two control points in the to-be-processed image block, $y_0$ is equal to $y_1$, $vx_0$ and $vx_1$ and $vy_0$ and $vy_1$ are corresponding horizontal and vertical motion vectors, $x_2$, $x_3$, and $x_4$ and $y_2$, $y_3$, and $y_4$ are respectively horizontal and vertical coordinates of the three control points in the affine motion prediction unit, and $vx_2$, $vx_3$, and $vx_4$ and $vy_2$, $vy_3$, and $vy_4$ are corresponding horizontal and vertical motion vectors.

S1433. Parse the bitstream to obtain a residual of the motion vectors of the two control points in the to-be-processed image block, and add the residual to the motion vectors obtained in S1432 of the two control points, to obtain updated motion vectors of the two control points in the to-be-processed image block. Because of the addition of the residual, the updated motion vectors are more accurate.

S1434. Obtain, according to the motion vectors obtained in S1433 of the two control points, a motion vector of the pixel point in the to-be-processed image block. This is implemented in the following manner:

$$vx = \frac{vx_1 - vx_0}{x_1 - x_0} \times x - \frac{vy_1 - vy_0}{x_1 - x_0} \times y + vx_0$$

$$vy = \frac{vy_1 - vy_0}{x_1 - x_0} \times x + \frac{vx_1 - vx_0}{x_1 - x_0} \times y + vy_0$$

where x and y are respectively horizontal and vertical coordinates of the pixel point in the to-be-processed image block, vx and vy are corresponding horizontal and vertical motion vectors, and $x_0$ and $x_1$ and $y_0$ and $y_1$ are respectively horizontal and vertical coordinates of two control points in the to-be-processed image block, where $y_0$ is equal to $y_1$, and $vx_0$ and $vx_1$ and $vy_0$ and $vy_1$ are corresponding horizontal and vertical motion vectors.

S1500. Perform motion compensation according to the prediction direction, the reference frame index, and the motion vector that are obtained, to find a predicted value of the pixel point in the to-be-processed image block, where predicted values of all pixel points form a predicted image of the to-be-processed image.

It should be understood that, in this embodiment of the present application, the first, second, third, and fourth are only intended to distinguish the pixel points, but should not be construed as any limitation on the protection scope of the present application. For example, a first control point may also be referred to as a second control point, and a second control point may be a first control point, and so on.

It should be further understood that sequence numbers of the foregoing processes do not mean execution sequences. The execution sequences of the processes should be determined according to functions and internal logic of the processes, and should not be construed as any limitation on the implementation processes of this embodiment of the present application.

It should be further understood that, a method for obtaining a predicted image by using a 6-parameter affine transformation model or 8-parameter affine transformation model is essentially the same as a method for obtaining a predicted image by using a 4-parameter affine transformation model. For brevity, details are not described herein.

Specifically, a decoding side reuses motion information of the affine motion prediction unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

To better prove beneficial effects of the present application, performance comparison is performed between this embodiment of the present application and a prediction method using an affine transformation model based on two control points in the prior art with respect to a random access encoding configuration and a low delay encoding configuration. A negative value indicates a percentage of improved encoding performance, and a positive value indicates a percentage of deteriorated encoding performance.

TABLE 1

| | Affine sequence | | | | | | | |
|---|---|---|---|---|---|---|---|---|
| | Random access (low bit rate) | | | | Random access (high bit rate) | | | |
| | Luminance | Chrominance 1 | Chrominance 2 | Structure similarity | Luminance | Chrominance 1 | Chrominance 2 | Structure similarity |
| Encoding performance | −2.7% | −2.7% | −2.7% | −3.3% | −2.1% | −1.9% | −1.9% | −2.5% |
| Encoding time | | 99% | | | | 99% | | |
| Decoding time | | 104% | | | | 104% | | |

| | Low delay (low bit rate) | | | | Low delay (high bit rate) | | | |
|---|---|---|---|---|---|---|---|---|
| | Luminance | Chrominance 1 | Chrominance 2 | Structure similarity | Luminance | Chrominance 1 | Chrominance 2 | Structure similarity |
| Encoding performance | −5.7% | −6.1% | −6.1% | −6.6% | −4.3% | −4.6% | −4.4% | −5.4% |
| Encoding time | | 100% | | | | 100% | | |
| Decoding time | | 105% | | | | 105% | | |

It may be learned that, under testing conditions of a low bit rate of random access, a high bit rate of random access, a low bit rate of a low delay, and a high bit rate of a low delay, the present application respectively reduces a bit rate by 2.7%, 2.1%, 5.7%, and 4.3% when complexity basically remains unchanged, thereby improving encoding efficiency.

Figure 4:
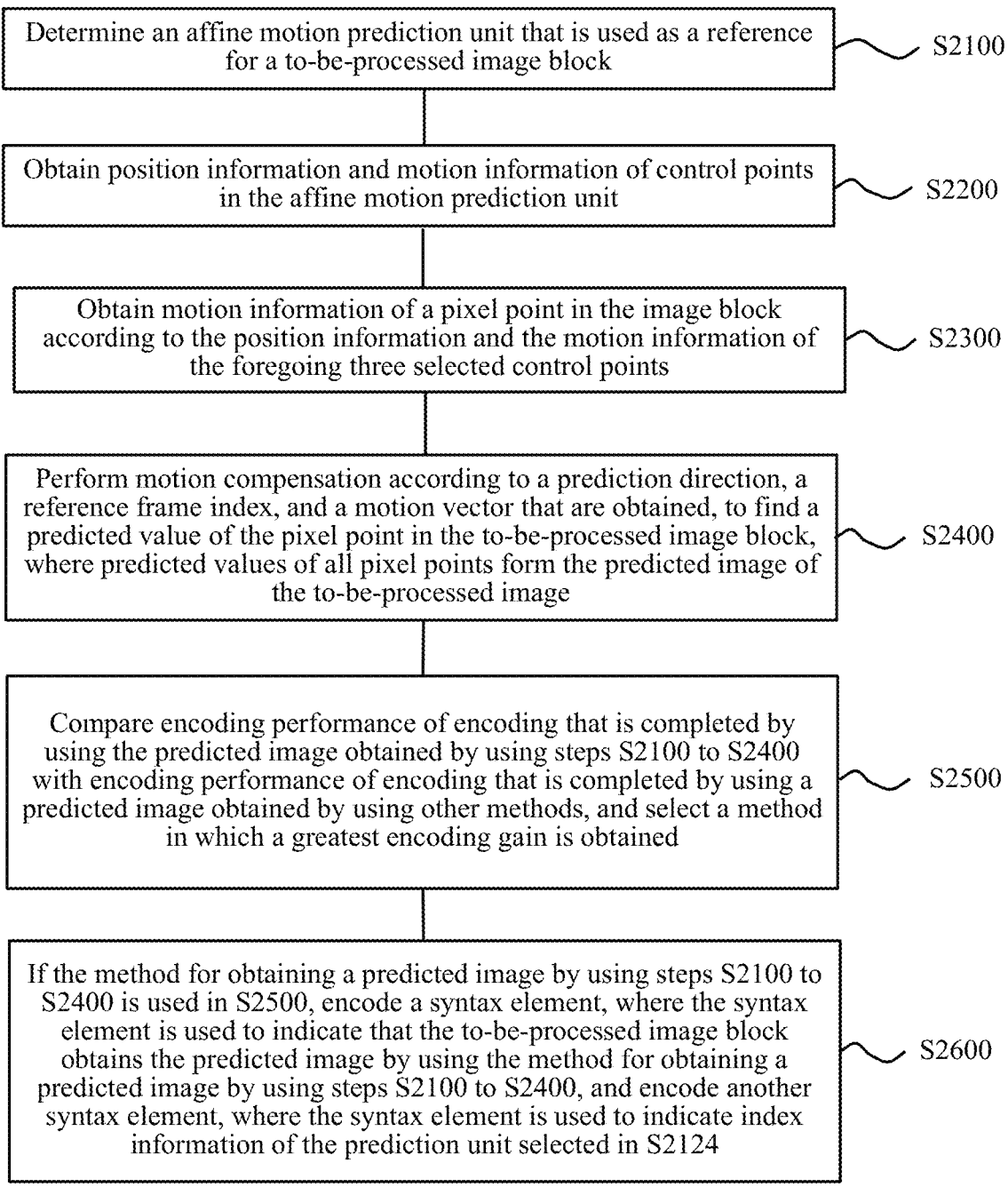
FIG. 4 is another schematic flowchart of an image prediction method according to an embodiment of the present application.

The foregoing describes the image prediction method, implemented on the decoding side, according to this embodiment of the present application in detail with reference to FIG. 1 to FIG. 3, and the following describes an image prediction method, implemented on an encoding side, according to an embodiment of the present application in detail with reference to FIG. 2 to FIG. 4. It should be noted that, related operations of the encoding side are essentially consistent with those of the decoding side. To avoid repetition, details are not described herein.

FIG. 4 is another schematic flowchart of an image prediction method 2000 according to an embodiment of the present application. The method shown in FIG. 4 may be performed by an encoding device, such as an encoder.

Specifically, as shown in FIG. 4, the method 2000 includes the following steps.

S2100. Determine an affine motion prediction unit that is used as a reference for a to-be-processed image block.

A first specific implementation method 2110 of the step includes the following steps.

S2111. Determine a set of candidate prediction units for the to-be-processed image block.

As shown in FIG. 2, in this embodiment of the present application, prediction units in which 4×4 blocks at five positions A, B, C, D, and E that are spatially adjacent to the to-be-processed image block are respectively located are selected to form the set. It should be understood that, alternatively, some of the positions A, B, C, D, and E may be selected, or prediction units in which other blocks adjacent in time domain to the to-be-processed image block are located may be selected to form the set, and no limitation is imposed thereon.

S2112. Check, in preset order, whether a prediction unit in the set is an affine motion prediction unit.

The preset order is an order that is predetermined in a protocol by encoding and decoding sides and is maintained consistent between the encoding and decoding sides. In this embodiment of the present application, the preset order is A, B, C, D, and E. It should be understood that, alternatively, the preset order may be B, D, A, E, and C, or another order, and no limitation is imposed thereon.

S2113. If it is found that the prediction unit is an affine motion prediction unit, stop checking and use the prediction unit as the affine motion prediction unit referred by the to-be-processed image block.

S2114. If none of the candidate prediction units is an affine motion prediction unit, encode a syntax element, where the syntax element is used to indicate that the to-be-processed image block does not reuse affine prediction information of an adjacent block, and stop performing a subsequent step; otherwise, continue to perform a subsequent step.

A second specific implementation method 2120 of the step includes the following steps:

S2121. Determine a set of candidate prediction units for the to-be-processed image block.

In addition to the same set determining manner as that in S2111, the method may further include: removing a non-affine motion prediction unit block in the set from the set. For example, the set determined by using the determining manner of S1211 includes the prediction units in which A, B, C, D, and E are located, and prediction units in which C and D are located are not affine motion prediction units. Therefore, C and D are removed from the set, and the determined set of candidate prediction units includes prediction units in which A, B and E are located.

Alternatively, the method may include: limiting a capacity of the set, and removing, from the set, a candidate prediction unit whose checking order ranks behind an allowable quantity of candidate prediction units. For example, the quantity of candidate prediction units in the set is set to a maximum of 2, and a set that is determined by using the determining manner of S2111 according to the checking order of S2112 is A, D, C, E, and B. Therefore, C, E, and B are removed from the set, and the determined set of candidate prediction units includes prediction units in which A and D are located. It should be understood that, the capacity of the set may be set to 3 or 4, or may not be limited if the capacity falls within a range that is greater than 0 but less than or equal to a maximum quantity of candidate prediction units determined by using the determining manner of S2111.

Alternatively, the foregoing two set determining manners may be used in combination.

S2122. If none of the candidate prediction units is an affine motion prediction unit, encode a syntax element, where the syntax element is used to indicate that the to-be-processed image block does not reuse affine prediction information of an adjacent block, and stop performing a subsequent step; if at least one of the candidate prediction units is an affine motion prediction unit, continue to perform a subsequent step.

S2123. Assign an index value to each candidate prediction unit in the set of candidate prediction units. A candidate prediction unit indicated by each index value is predetermined in a protocol by encoding and decoding sides and is maintained consistent on the encoding and decoding sides.

S2124. Traverse all the candidate prediction units in the set of candidate prediction units, and perform processing according to subsequent steps S2200 to S2400, to obtain a predicted image of the to-be-processed image block, and complete encoding for the to-be-processed image block; and compare encoding gains made by selected candidate prediction vectors, and select a candidate prediction unit with a greatest encoding gain as an affine motion prediction unit referred by a to-be-processed image block.

For example, if the set of candidate prediction units includes two candidate prediction units A and B, an index of A is 0 and an index of B is 1. If a gain that is obtained by using A as the affine motion prediction unit referred by the to-be-processed image block, to complete a subsequent processing step, obtain the predicted image of the to-be-processed image block, and complete encoding for the to-be-processed image block is the largest, A is the affine motion prediction unit referred by the to-be-processed image block; otherwise, B is the affine motion prediction unit referred by the to-be-processed image block.

It should be understood that, to improve an encoding speed, step S2124 may be replaced with a fast algorithm. For example, some but not all of the candidate prediction units in the set of candidate prediction units may be selected for traversal. Alternatively, the entire encoding process of the to-be-processed image block is not completed, and after predicted images are obtained, according to accuracy of the predicted images, a prediction unit that can be used to obtain a most accurate predicted image is used as the affine motion prediction unit referred by the to-be-processed image block.

S2200. Obtain position information and motion information of control points in the affine motion prediction unit. This step is consistent with S1300, and details are not described again.

S2300. Obtain motion information of a pixel point in the image block according to the position information and the motion information of the foregoing three selected control points. This step is consistent with S1400, and details are not described again.

S2400. Perform motion compensation according to a prediction direction, a reference frame index, and a motion vector that are obtained, to find a predicted value of the pixel point in the to-be-processed image block, where predicted values of all pixel points form the predicted image of the to-be-processed image. This step is consistent with S1500, and details are not described again.

S2500. Compare encoding performance of encoding that is completed by using the predicted image obtained by using steps S2100 to S2400 with encoding performance of encoding that is completed by using a predicted image obtained by using other methods, and select a method in which a greatest encoding gain is obtained, as a method for encoding a predicted image.

It should be understood that, to improve an encoding speed, S2500 may also be replaced with the fast algorithm described in S2124, and details are not described again.

S2600. If the method for obtaining a predicted image by using steps S2100 to S2400 is used in S2500, encode a syntax element, where the syntax element is used to indicate that the to-be-processed image block obtains the predicted image by using the method for obtaining a predicted image by using steps S2100 to S2400, and encode another syntax element, where the syntax element is used to indicate index information of the prediction unit selected in S2124.

It should be understood that, the image prediction method in this embodiment of the present application, as a prediction technology, may also be technically combined with another prediction technology in the prior art, such as a technology using multiple reference frames for prediction, and no limitation is imposed thereon.

Specifically, the encoding side reuses motion information of a first reference unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

Figure 5:
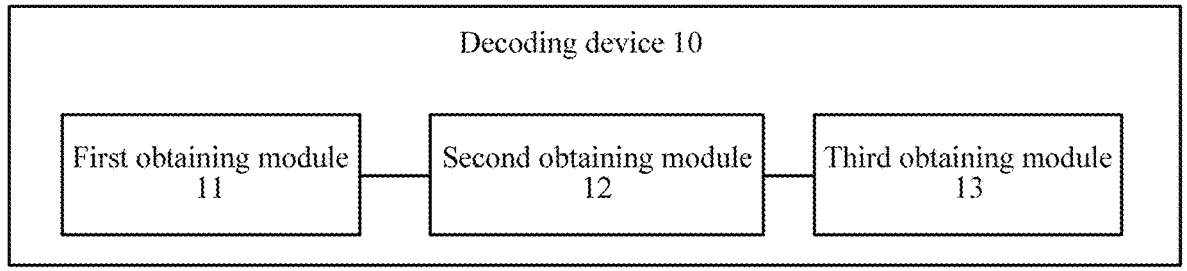
FIG. 5 is a schematic block diagram of an image prediction device according to an embodiment of the present application.

The following describes in detail a decoding device according to an embodiment of the present application with reference to FIG. 5. As shown in FIG. 5, the decoding device 10 includes:

a first obtaining module 11, configured to obtain an affine motion prediction unit of an image unit;

a second obtaining module 12, configured to obtain position information and motion information of the affine motion prediction unit; and a third obtaining module 13, configured to obtain motion information of the image unit according to position information and the motion information.

Specifically, the encoding side reuses motion information of a first reference unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

In this embodiment of the present application, optionally, a bitstream is read and is parsed to obtain a syntax element, where the syntax element is used to determine whether a to-be-processed image block reuses affine model motion information of an adjacent block. When it is determined that the to-be-processed image block reuses the affine model motion information of the adjacent block, the process continues.

In this embodiment of the present application, optionally, that the first obtaining module 11 is specifically configured to determine the affine motion prediction unit that is used as a reference for the to-be-processed image block includes: determining a set of candidate prediction units for the to-be-processed image block, checking, in preset order, whether a prediction unit in the set is an affine motion prediction unit, and if it is found that the prediction unit is an affine motion prediction unit, stopping checking and using the prediction unit as the affine motion prediction unit referred by the to-be-processed image block; or determining a set of candidate prediction units for the to-be-processed image block, reading the bitstream and parsing the bitstream to obtain a syntax element, where the syntax element is used to indicate index information of the affine motion prediction unit that is in the set of candidate prediction units and that is used as a reference for the to-be-processed image block, and determining, according to the index information, the affine motion prediction unit that is used as a reference for the to-be-processed image block.

In this embodiment of the present application, optionally, that the second obtaining module 12 is specifically configured to obtain position information and motion information of control points in the affine motion prediction unit includes: selecting any three control points from four control points in the affine motion prediction unit, and obtaining position information, motion vector information, prediction directions, and reference frame indexes of the three control points; or selecting any two control points, which may be referred to as first and second control points, from four control points in the affine motion prediction unit and obtaining position information, motion vector information, prediction directions, and reference frame indexes of the two control points, and then selecting any control point, which may be referred to as a third control point, from the remaining two control points and obtaining position information of the third control point. Motion vector information of the third control point may be derived according to the first and second control points in the following manner:

$$vx = \frac{vx_1 - vx_2}{x_1 - x_2} \times x - \frac{vy_1 - vy_2}{x_1 - x_2} \times y + vx_2$$
$$vy = \frac{vy_1 - vy_2}{x_1 - x_2} \times x + \frac{vx_1 - vx_2}{x_1 - x_2} \times y + vy_2$$

where x and y are respectively horizontal and vertical coordinates of the third control point, vx and vy are corresponding horizontal and vertical motion vectors, and $x_1$ and $x_2$ and $y_1$ and $y_2$ are respectively horizontal and vertical coordinates of the first and second control points, where $y_1$ is equal to $y_2$, and $vx_1$ and $vx_2$ and $vy_1$ and $vy_2$ are corresponding horizontal and vertical motion vectors.

Because all pixel points in a same affine motion prediction unit have a same prediction direction and a same reference frame index, the prediction directions and the reference frame indexes of all the control points are also the same. The third control point has a same prediction direction and reference frame index as those of the first and second control points.

In this embodiment of the present application, optionally, that the third obtaining module 13 is specifically configured to obtain motion information of a pixel point in the image block according to the position information and the motion information of the foregoing three selected control points includes: assigning a prediction direction and a reference frame index of any one of the control points to the pixel point in the to-be-processed image block; or parsing the bitstream to obtain reference frame information of the to-be-processed image block, where the reference frame information includes a prediction direction and a reference frame index.

In this embodiment of the present application, optionally, that the third obtaining module 13 is specifically configured to obtain motion information of a pixel point in the image block according to the position information and the motion information of the foregoing three selected control points includes: obtaining, according to the obtained position information and motion vectors of the any three control points, a motion vector of the pixel point in the to-be-processed image block. This is implemented in the following manner:

$$vx = \frac{vx_3 - vx_2}{x_3 - x_2}x + \frac{vx_4 - vx_2}{y_4 - y_2}y + vx_2$$
$$vy = \frac{vy_3 - vy_2}{x_3 - x_2}x + \frac{vy_4 - vy_2}{y_4 - y_2}y + vy_2$$

where x and y are respectively horizontal and vertical coordinates of the pixel point in the to-be-processed image block, vx and vy are corresponding horizontal and vertical motion vectors, $x_1$, $x_2$, and $x_3$ and $y_1$, $y_2$, and $y_3$ are respectively horizontal and vertical coordinates of the any three control points in the affine motion prediction unit, and $vx_1$, $vx_2$, $vx_3$ and $vy_1$, $vy_2$, and $vy_3$ are corresponding horizontal and vertical motion vectors.

Alternatively, motion vectors of any two control points in the to-be-processed image block are obtained according to the obtained position information and motion vectors of the any three control points. This is implemented in the following manner:

$$vx_0 = vx_3 + \frac{(y_0 - y_3) \times (vx_4 - vx_2)}{(y_4 - y_2)}, vy_0 = vy_3 + \frac{(y_0 - y_3) \times (vy_4 - vy_2)}{(y_4 - y_2)}$$
$$vx_1 = vx_0 + \frac{(x_1 - x_0) \times (vx_3 - vx_2)}{(x_3 - x_2)}, vy_1 = vy_0 + \frac{(x_1 - x_0) \times (vy_3 - vy_2)}{(x_3 - x_2)}$$

where $x_0$ and $x_1$ and $y_0$ and $y_1$ are respectively horizontal and vertical coordinates of the two control points in the to-be-processed image block, $y_0$ is equal to $y_1$, $vx_0$ and $vx_1$ and $vy_0$ and $vy_1$ are corresponding horizontal and vertical motion vectors, $x_0$ and $y_0$ are respectively horizontal and vertical coordinates of a control point in the to-be-processed image block, $x_2$, $x_3$, and $x_4$ and $y_2$, $y_3$, and $y_4$ are respectively horizontal and vertical coordinates of the three control points in the affine motion prediction unit, and $vx_2$, $vx_3$, and $vx_4$ and $vy_2$, $vy_3$, and $vy_4$ are corresponding horizontal and vertical motion vectors.

A motion vector of the pixel point in the to-be-processed image block is obtained according to the obtained motion vectors of the two control points. This is implemented in the following manner:

$$vx = \frac{vx_1 - vx_0}{x_1 - x_0} \times x - \frac{vy_1 - vy_0}{x_1 - x_0} \times y + vx_0$$

-continued
$$vy = \frac{vy_1 - vy_0}{x_1 - x_0} \times x + \frac{vx_1 - vx_0}{x_1 - x_0} \times y + vy_0$$

where x and y are respectively horizontal and vertical coordinates of the pixel point in the image block, vx and vy are corresponding horizontal and vertical motion vectors, and $x_0$ and $x_1$ and $y_0$ and $y_1$ are respectively horizontal and vertical coordinates of two control points in the to-be-processed image block, where $y_0$ is equal to $y_1$, and $vx_0$ and $vx_1$ and $vy_0$ and $vy_1$ are corresponding horizontal and vertical motion vectors.

Alternatively, motion vectors of any two control points in the to-be-processed image block are obtained according to the obtained position information and motion vectors of the any three control points. This is implemented in the following manner:

$$vx_0 = vx_3 + \frac{(y_0 - y_3) \times (vx_4 - vx_2)}{(y_4 - y_2)}, vy_0 = vy_3 + \frac{(y_0 - y_3) \times (vy_4 - vy_2)}{(y_4 - y_2)}$$
$$vx_1 = vx_0 + \frac{(x_1 - x_0) \times (vx_3 - vx_2)}{(x_3 - x_2)}, vy_1 = vy_0 + \frac{(x_1 - x_0) \times (vy_3 - vy_2)}{(x_3 - x_2)}$$

where $x_0$ and $x_1$ and $y_0$ and $y_1$ are respectively horizontal and vertical coordinates of the two control points in the to-be-processed image block, $y_0$ is equal to $y_1$, $vx_0$ and $vx_1$ and $vy_0$ and $vy_1$ are corresponding horizontal and vertical motion vectors, $x_2$, $x_3$, and $x_4$ and $y_2$, $y_3$, $y_4$ are respectively horizontal and vertical coordinates of the three control points in the affine motion prediction unit, and $vx_2$, $vx_3$, and $vx_4$ and $vy_2$, $vy_3$, and $vy_4$ are corresponding horizontal and vertical motion vectors.

The bitstream is parsed to obtain a residual of the motion vectors of the two control points in the to-be-processed image block, and the residual is added to the obtained motion vectors of the two control points, to obtain updated motion vectors of the two control points in the to-be-processed image block.

A motion vector of the pixel point in the to-be-processed image block is obtained according to the obtained motion vectors of the two control points. This is implemented in the following manner:

$$vx = \frac{vx_1 - vx_0}{x_1 - x_0} \times x - \frac{vy_1 - vy_0}{x_1 - x_0} \times y + vx_0$$
$$vy = \frac{vy_1 - vy_0}{x_1 - x_0} \times x + \frac{vx_1 - vx_0}{x_1 - x_0} \times y + vy_0$$

where x and y are respectively horizontal and vertical coordinates of the pixel point in the to-be-processed image block, vx and vy are corresponding horizontal and vertical motion vectors, and $x_0$ and $x_1$ and $y_0$ and $y_1$ are respectively horizontal and vertical coordinates of two control points in the to-be-processed image block, where $y_0$ is equal to $y_1$, and $vx_0$ and $vx_1$ and $vy_0$ and $vy_1$ are corresponding horizontal and vertical motion vectors.

In this embodiment of the present application, optionally, the third obtaining module 13 is specifically configured to perform motion compensation according to the prediction direction, the reference frame index, and the motion vector that are obtained, to find a predicted value of the pixel point in the to-be-processed image block. Predicted values of all pixel points form a predicted image of the to-be-processed image.

It should be understood that the encoding device 10 according to this embodiment of the present application may correspondingly perform the image prediction method 1000 in the embodiment of the present application, and the foregoing and other operations and/or functions of modules of the encoding device 10 are separately used to implement the corresponding procedure of the method in FIG. 1. For brevity, details are not described herein.

Therefore, the decoding device in this embodiment of the present application reuses motion information of a first reference unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

Figure 6:
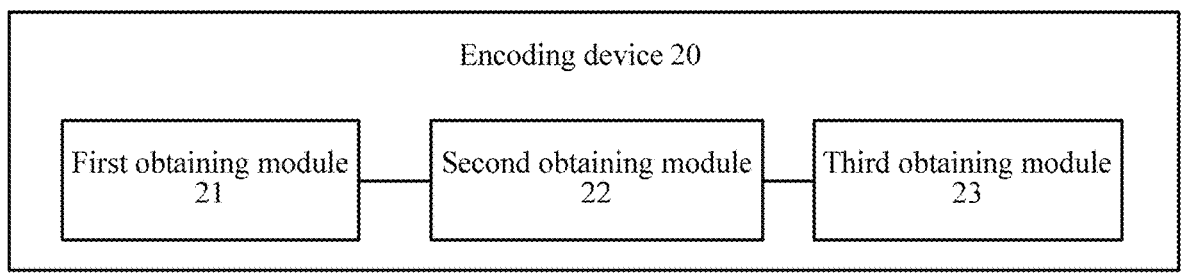
FIG. 6 is another schematic block diagram of an image prediction device according to an embodiment of the present application.

The following describes in detail an encoding device according to an embodiment of the present application with reference to FIG. 6. As shown in FIG. 6, the encoding device 20 includes:

a first obtaining module 21, configured to obtain an affine motion prediction unit of an image unit;

a second obtaining module 22, configured to obtain position information and motion information of the affine motion prediction unit; and a third obtaining module 23, configured to obtain motion information of the image unit according to position information and the motion information.

Specifically, the encoding side reuses motion information of a first reference unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

In this embodiment of the present application, optionally, that the first obtaining module 21 is specifically configured to determine the affine motion prediction unit that is used as a reference for the to-be-processed image block includes: determining a set of candidate prediction units for the to-be-processed image block, checking, in preset order, whether a prediction unit in the set is an affine motion prediction unit, and if it is found that the prediction unit is an affine motion prediction unit, stopping checking and using the prediction unit as the affine motion prediction unit referred by the to-be-processed image block, or if none of the candidate prediction units is an affine motion prediction unit, encoding a syntax element, where the syntax element is used to indicate that the to-be-processed image block does not reuse affine prediction information of an adjacent block, and stopping performing a subsequent step; otherwise, continuing to perform a subsequent step; or determining a set of candidate prediction units for the to-be-processed image block, if none of the candidate prediction units is an affine motion prediction unit, encoding a syntax element, where the syntax element is used to indicate that the to-be-processed image block does not reuse affine prediction information of an adjacent block, and stopping performing a subsequent step; otherwise, continuing to perform a subsequent step, and assigning an index value to each candidate prediction unit in the set of candidate prediction units. A candidate prediction unit represented by each index value is predetermined in a protocol by encoding and decoding sides and is maintained consistent on the encoding and decoding sides. All the candidate prediction units in the set of candidate prediction units are traversed to obtain a predicted image of the to-be-processed image block, and complete encoding for the to-be-processed image block. Encoding gains made by selected candidate prediction vectors are compared, and a candidate prediction unit with a greatest encoding gain is selected as an affine motion prediction unit referred by a to-be-processed image block.

In this embodiment of the present application, optionally, the second obtaining module 22 is specifically configured to obtain position information and motion information of control points in the affine motion prediction unit. A function of the module is the same as that of the second obtaining module 12, and details are not described again.

In this embodiment of the present application, optionally, the third obtaining module 23 is specifically configured to obtain motion information of a pixel point in an image block according to the position information and the motion information of the foregoing three selected control points. A function of the module is the same as that of the third obtaining module 13, and details are not described again.

In this embodiment of the present application, optionally, the third obtaining module 23 is specifically configured to perform motion compensation according to the prediction direction, the reference frame index, and the motion vector that are obtained, to find a predicted value of the pixel point in the to-be-processed image block. Predicted values of all pixel points form a predicted image of the to-be-processed image. A function of the module is the same as that of the third obtaining module 13, and details are not described again.

In this embodiment of the present application, optionally, encoding performance of encoding that is completed by using the predicted image obtained by this device is compared with encoding performance of encoding that is completed by using a predicted image obtained by using other devices, and a device by which a greatest encoding gain is obtained is selected as a device for encoding a predicted image.

In this embodiment of the present application, optionally, if the predicted image obtained by using this device is used, a syntax element is encoded, where the syntax element is used to indicate that the method for obtaining a predicted image by using this device is used, and another syntax element is encoded, where the syntax element is used to indicate index information of the selected prediction unit.

It should be understood that the encoding device 20 according to this embodiment of the present application may correspondingly perform the image prediction method 2000 in the embodiment of the present application, and the foregoing and other operations and/or functions of modules of the encoding device 20 are separately used to implement the corresponding procedure of the method in FIG. 4. For brevity, details are not described herein.

Therefore, the encoding device in this embodiment of the present application reuses motion information of a first reference unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

Figure 7:
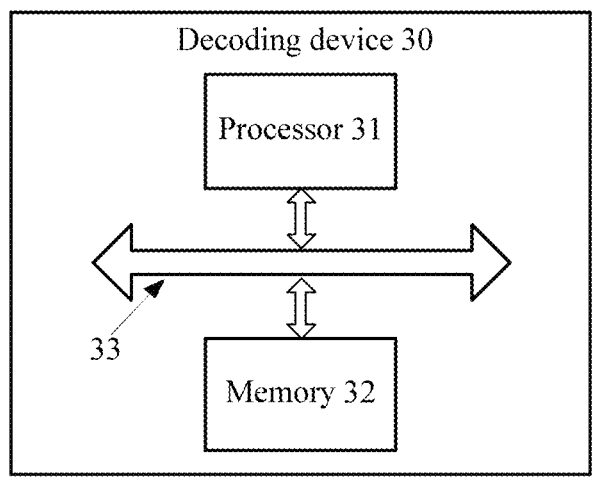
FIG. 7 is another schematic block diagram of an image prediction device according to an embodiment of the present application.

As shown in FIG. 7, an embodiment of the present application further provides a decoding device 30, including a processor 31, a memory 32, and a bus system 33. The processor 31 and the memory 32 are connected by using the bus system 33, the memory 32 is configured to store an instruction, and the processor 31 is configured to execute the instruction stored in the memory 32. The memory 32 of the decoding device 30 stores program code, and the processor 31 may invoke the program code stored in the memory 32 to perform the following operations: obtaining a first reference unit of an image unit, where respective predicted images are obtained for the image unit and the first reference unit by using a same affine model; obtaining motion information of basic motion compensation units at two or more preset positions in the first reference unit; and obtaining motion information of a basic motion compensation unit of the image unit according to the motion information.

Therefore, the decoding device in this embodiment of the present application reuses motion information of the first reference unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

It should be understood that in this embodiment of the present application, the processor 31 may be a central processing unit (CPU), and the processor 31 may further be another general-purpose processor, a digital signal processor (DSP), an application-specific integrated circuit (ASIC), a field-programmable gate array (FPGA) or another programmable logical device, a discrete gate or transistor logical device, a discrete hardware component, or the like. The general-purpose processor may be a microprocessor or the processor may be any conventional processor and the like.

The memory 32 may include a read-only memory and a random access memory, and provide an instruction and data for the processor 31. A part of the memory 32 may further include a non-volatile random access memory. For example, the memory 32 may further store device type information.

The bus system 33, in addition to a data bus, may further include a power bus, a control bus, a status signal bus, and the like. However, for purpose of clear description, various types of buses in the figure are all marked as the bus system 33.

During implementation, each step of the foregoing methods may be implemented by a hardware integrated logic circuit in the processor 31 or by an instruction in a software form. The steps of the methods disclosed with reference to the embodiments of the present application may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 32, and the processor 31 reads information in the memory 32 and completes the steps in the foregoing methods in combination with hardware of the processor 31. To avoid repetition, details are not described herein again.

Optionally, in an embodiment, the processor 31 is specifically configured to: read a bitstream and parse the bitstream to obtain a syntax element, where the syntax element is used to determine whether a to-be-processed image block reuses affine model motion information of an adjacent block. When it is determined that the to-be-processed image block reuses the affine model motion information of the adjacent block, the process continues.

Optionally, in an embodiment, that the processor 31 is specifically configured to determine an affine motion prediction unit that is used as a reference for the to-be-processed image block includes: determining a set of candidate prediction units for the to-be-processed image block, checking, in preset order, whether a prediction unit in the set is an affine motion prediction unit, and if it is found that the prediction unit is an affine motion prediction unit, stopping checking and using the prediction unit as the affine motion prediction unit referred by the to-be-processed image block; or determining a set of candidate prediction units for the to-be-processed image block, reading the bitstream and parsing the bitstream to obtain a syntax element, where the syntax element is used to indicate index information of the affine motion prediction unit that is in the set of candidate prediction units and that is used as a reference for the to-be-processed image block, and determining, according to the index information, the affine motion prediction unit that is used as a reference for the to-be-processed image block.

Optionally, in an embodiment, that the processor 31 is specifically configured to obtain position information and motion information of control points in the affine motion prediction unit includes: selecting any three control points from four control points in the affine motion prediction unit, and obtaining position information, motion vector information, prediction directions, and reference frame indexes of the three control points; or selecting any two control points, which may be referred to as first and second control points, from four control points in the affine motion prediction unit and obtaining position information, motion vector information, prediction directions, and reference frame indexes of the two control points, and then selecting any control point, which may be referred to as a third control point, from the remaining two control points and obtaining position information of the third control point. Motion vector information of the third control point may be derived according to the first and second control points in the following manner:

$$vx = \frac{vx_1 - vx_2}{x_1 - x_2} \times x - \frac{vy_1 - vy_2}{x_1 - x_2} \times y + vx_2$$

$$vy = \frac{vy_1 - vy_2}{x_1 - x_2} \times x + \frac{vx_1 - vx_2}{x_1 - x_2} \times y + vy_2$$

where x and y are respectively horizontal and vertical coordinates of the third control point, $y_1$ is equal to $y_2$, vx and vy are corresponding horizontal and vertical motion vectors, $x_1$ and $x_2$ and $y_1$ and $y_2$ are respectively horizontal and vertical coordinates of the first and second control points, and $vx_1$, and $vx_2$ and $vy_1$ and $vy_2$ are corresponding horizontal and vertical motion vectors.

Because all pixel points in a same affine motion prediction unit have a same prediction direction and a same reference frame index, the prediction directions and the reference frame indexes of all the control points are also the same. The third control point has a same prediction direction and reference frame index as those of the first and second control points.

Optionally, in an embodiment, that the processor 31 is specifically configured to obtain motion information of a pixel point in the image block according to the position information and the motion information of the foregoing three selected control points includes: assigning a prediction direction and a reference frame index of any one of the control points to the pixel point in the to-be-processed image block; or parsing the bitstream to obtain reference frame information of the to-be-processed image block, where the reference frame information includes a prediction direction and a reference frame index.

Optionally, in an embodiment, that the processor 31 is specifically configured to obtain motion information of a pixel point in the image block according to the position information and the motion information of the foregoing three selected control points includes: obtaining, according to the obtained position information and motion vectors of the any three control points, a motion vector of the pixel point in the to-be-processed image block. This is implemented in the following manner:

$$vx = \frac{vx_3 - vx_2}{x_3 - x_2}x + \frac{vx_4 - vx_2}{y_4 - y_2}y + vx_2$$

$$vy = \frac{vy_3 - vy_2}{x_3 - x_2}x + \frac{vy_4 - vy_2}{y_4 - y_2}y + vy_2$$

where x and y are respectively horizontal and vertical coordinates of the pixel point in the to-be-processed image block, vx and vy are corresponding horizontal and vertical motion vectors, $x_1$, $x_2$, and $x_3$ and $y_1$, $y_2$, and $y_3$ are respectively horizontal and vertical coordinates of the any three control points in the affine motion prediction unit, and $vx_1$, $vx_2$, and $vx_3$ and $vy_1$, $vy_2$, and $vy_3$ are corresponding horizontal and vertical motion vectors.

Alternatively, motion vectors of any two control points in the to-be-processed image block are obtained according to the obtained position information and motion vectors of the any three control points. This is implemented in the following manner:

$$vx_0 = vx_3 + \frac{(y_0 - y_3) \times (vx_4 - vx_2)}{(y_4 - y_2)}, vy_0 = vy_3 + \frac{(y_0 - y_3) \times (vy_4 - vy_2)}{(y_4 - y_2)}$$

$$vx_1 = vx_0 + \frac{(x_1 - x_0) \times (vx_3 - vx_2)}{(x_3 - x_2)}, vy_1 = vy_0 + \frac{(x_1 - x_0) \times (vy_3 - vy_2)}{(x_3 - x_2)}$$

where $x_0$ and $x_1$ and $y_0$ and $y_1$ are respectively horizontal and vertical coordinates of the two control points in the to-be-processed image block, $y_0$ is equal to $y_1$, $vx_0$ and $vx_1$ and $vy_0$ and $vy_1$ are corresponding horizontal and vertical motion vectors, $x_2$, $x_3$, and $x_4$ and $y_2$, $y_3$, and $y_4$ are respectively horizontal and vertical coordinates of the three control points in the affine motion prediction unit, and $vx_2$, $vx_3$, and $vx_4$ and $vy_2$, $vy_3$, and $vy_4$ are corresponding horizontal and vertical motion vectors.

A motion vector of the pixel point in the to-be-processed image block is obtained according to the obtained motion vectors of the two control points. This is implemented in the following manner:

$$vx = \frac{vx_1 - vx_0}{x_1 - x_0} \times x - \frac{vy_1 - vy_0}{x_1 - x_0} \times y + vx_0$$

$$vy = \frac{vy_1 - vy_0}{x_1 - x_0} \times x + \frac{vx_1 - vx_0}{x_1 - x_0} \times y + vy_0$$

where x and y are respectively horizontal and vertical coordinates of the pixel point in the image block, vx and vy are corresponding horizontal and vertical motion vectors, and $x_0$ and $x_1$ and $y_0$ and $y_1$ $y_0$ $y_1$ are respectively horizontal and vertical coordinates of two control points in the to-be-processed image block, where $y_0$ is equal to $y_1$, and $vx_0$ and $vx_1$ and $vy_0$ and $vy_1$ are corresponding horizontal and vertical motion vectors.

Alternatively, motion vectors of any two control points in the to-be-processed image block are obtained according to the obtained position information and motion vectors of the any three control points. This is implemented in the following manner:

$$vx_0 = vx_3 + \frac{(y_0 - y_3) \times (vx_4 - vx_2)}{(y_4 - y_2)}, vy_0 = vy_3 + \frac{(y_0 - y_3) \times (vy_4 - vy_2)}{(y_4 - y_2)}$$

$$vx_1 = vx_0 + \frac{(x_1 - x_0) \times (vx_3 - vx_2)}{(x_3 - x_2)}, vy_1 = vy_0 + \frac{(x_1 - x_0) \times (vy_3 - vy_2)}{(x_3 - x_2)}$$

where $x_0$ and $x_1$ and $y_0$ and $y_1$ are respectively horizontal and vertical coordinates of the two control points in the to-be-processed image block, $y_0$ is equal to $y_1$, $vx_0$ and $vx_1$ and $vy_0$ and $vy_1$ are corresponding horizontal and vertical motion vectors, $x_2$, $x_3$, and $x_4$ and $y_2$, $y_3$, and $y_4$ are respectively horizontal and vertical coordinates of the three control points in the affine motion prediction unit, and $vx_2$, $vx_3$, and $vx_4$ and $vy_2$, $vy_3$, and $vy_4$ are corresponding horizontal and vertical motion vectors.

The bitstream is parsed to obtain a residual of the motion vectors of the two control points in the to-be-processed image block, and the residual is added to the obtained motion vectors of the two control points, to obtain updated motion vectors of the two control points in the to-be-processed image block.

A motion vector of the pixel point in the to-be-processed image block is obtained according to the obtained motion vectors of the two control points. This is implemented in the following manner:

$$vx = \frac{vx_1 - vx_0}{x_1 - x_0} \times x - \frac{vy_1 - vy_0}{x_1 - x_0} \times y + vx_0$$

$$vy = \frac{vy_1 - vy_0}{x_1 - x_0} \times x + \frac{vx_1 - vx_0}{x_1 - x_0} \times y + vy_0$$

where x and y are respectively horizontal and vertical coordinates of the pixel point in the to-be-processed image block, vx and vy are corresponding horizontal and vertical motion vectors, and $x_0$ and $x_1$ and $y_0$ and $y_1$ are respectively horizontal and vertical coordinates of two control points in the to-be-processed image block, where $y_0$ is equal to $y_1$, and $vx_0$ and $vx_1$ and $vy_0$ and $vy_1$ are corresponding horizontal and vertical motion vectors.

Optionally, in an embodiment, the processor 31 is specifically configured to: perform motion compensation according to the prediction direction, the reference frame index, and the motion vector that are obtained, to find a predicted value of the pixel point in the to-be-processed image block. Predicted values of all pixel points form a predicted image of the to-be-processed image.

It should be understood that the decoding device 30 according to this embodiment of the present application may correspond to the decoding device 10 in the embodiment of the present application, and may correspond to a corresponding main entity that performs the method 1000 in the embodiment of the present application. The foregoing and other operations and/or functions of the modules of the decoding device 30 are separately used to implement the corresponding procedure of the method in FIG. 1. For brevity, details are not described herein.

Therefore, the decoding device in this embodiment of the present application reuses motion information of the first reference unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

Figure 8:
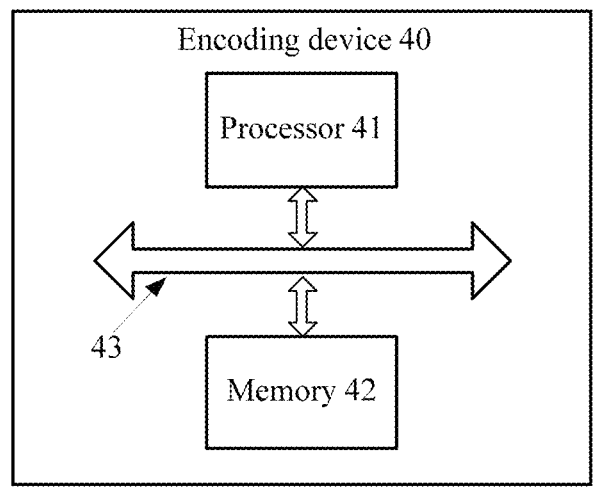
FIG. 8 is another schematic block diagram of an image prediction device according to an embodiment of the present application.

As shown in FIG. 8, an embodiment of the present application further provides an encoding device 40, including a processor 41, a memory 42, and a bus system 43. The processor 41 and the memory 42 are connected by using the bus system 43, the memory 42 is configured to store an instruction, and the processor 41 is configured to execute the instruction stored in the memory 42. The memory 42 of the encoding device 40 stores program code, and the processor 41 may invoke the program code stored in the memory 42 to perform the following operations: obtaining a first reference unit of an image unit, where respective predicted images are obtained for the image unit and the first reference unit by using a same affine model; obtaining motion information of basic motion compensation units at two or more preset positions in the first reference unit; and obtaining motion information of a basic motion compensation unit of the image unit according to the motion information.

Therefore, the encoding device in this embodiment of the present application reuses motion information of the first reference unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

It should be understood that in this embodiment of the present application, the processor 41 may be a central processing unit, and the processor 41 may further be another general-purpose processor, a digital signal processor, an application-specific integrated circuit, a field-programmable gate array or another programmable logical device, a discrete gate or transistor logical device, a discrete hardware component, or the like. The general-purpose processor may be a microprocessor or the processor may be any conventional processor and the like.

The memory 42 may include a read-only memory and a random access memory, and provide an instruction and data for the processor 41. A part of the memory 42 may further include a non-volatile random access memory. For example, the memory 42 may further store device type information.

The bus system 43, in addition to a data bus, may further include a power bus, a control bus, a status signal bus, and the like. However, for purpose of clear description, various types of buses in the figure are all marked as the bus system 43.

During implementation, each step of the foregoing methods may be implemented by a hardware integrated logic circuit in the processor 41 or by an instruction in a software form. The steps of the methods disclosed with reference to the embodiments of the present application may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 42, and the processor 41 reads information in the memory 42 and completes the steps in the foregoing methods in combination with hardware of the processor 41. To avoid repetition, details are not described herein again.

Optionally, in an embodiment, that the processor 41 is specifically configured to determine an affine motion prediction unit that is used as a reference for a to-be-processed image block includes: determining a set of candidate prediction units for the to-be-processed image block, checking, in preset order, whether a prediction unit in the set is an affine motion prediction unit, and if it is found that the prediction unit is an affine motion prediction unit, stopping checking and using the prediction unit as the affine motion prediction unit referred by the to-be-processed image block, or if none of the candidate prediction units is an affine motion prediction unit, encoding a syntax element, where the syntax element is used to indicate that the to-be-processed image block does not reuse affine prediction information of an adjacent block, and stopping performing a subsequent step; otherwise, continuing to perform a subsequent step; or determining a set of candidate prediction units for the to-be-processed image block, if none of the candidate prediction units is an affine motion prediction unit, encoding a syntax element, where the syntax element is used to indicate that the to-be-processed image block does not reuse affine prediction information of an adjacent block, and stopping performing a subsequent step; otherwise, continuing to perform a subsequent step, and assigning an index value to each candidate prediction unit in the set of candidate prediction units. A candidate prediction unit represented by each index value is predetermined in a protocol by encoding and decoding sides and is maintained consistent on the encoding and decoding sides. All the candidate prediction units in the set of candidate prediction units are traversed to obtain a predicted image of the to-be-processed image block, and complete encoding for the to-be-processed image block. Encoding gains made by selected candidate prediction vectors are compared, and a candidate prediction unit with a greatest encoding gain is selected as an affine motion prediction unit referred by a to-be-processed image block.

Optionally, in an embodiment, the processor 41 is specifically configured to obtain position information and motion information of control points in the affine motion prediction unit. A function of the module is the same as that of the processor 31, and details are not described again.

Optionally, in an embodiment, the processor 41 is specifically configured to obtain motion information of a pixel point in the image block according to position information and motion information of three selected control points. A function of the module is the same as that of the processor 31, and details are not described again.

Optionally, in an embodiment, the processor 41 is specifically configured to perform motion compensation according to the prediction direction, the reference frame index, and the motion vector that are obtained, to find a predicted value of the pixel point in the to-be-processed image block. Predicted values of all pixel points form a predicted image of the to-be-processed image. A function of the module is the same as that of the processor 31, and details are not described again.

Optionally, in an embodiment, the processor 41 is specifically configured to: compare encoding performance of encoding that is completed by using the predicted image obtained by this device with encoding performance of encoding that is completed by using a predicted image obtained by using another device, and select a device by which a greatest encoding gain is obtained, as a device for encoding a predicted image.

Optionally, in an embodiment, the processor 41 is specifically configured to: if the predicted image obtained by using this device is used, encode a syntax element, where the syntax element is used to indicate that the method for obtaining a predicted image by using this device is used, and encode another syntax element, where the syntax element is used to indicate index information of the selected prediction unit.

It should be understood that the encoding device 40 according to this embodiment of the present application may correspond to the encoding device 20 in the embodiment of the present application, and may correspond to a corresponding main entity that performs the method 2000 in the embodiment of the present application. The foregoing and other operations and/or functions of the modules of the encoding device 40 are separately used to implement the corresponding procedure of the method in FIG. 4. For brevity, details are not described herein.

Therefore, the encoding device in this embodiment of the present application reuses motion information of the first reference unit using a same affine motion prediction model, and therefore, obtains a more accurate motion vector of a current image unit without encoding and decoding a motion vector difference and without extra searching for a high-precision motion vector. In this way, prediction accuracy is improved and encoding and decoding complexity are maintained, thereby improving encoding and decoding performance.

It should be understood that "an embodiment" or "an embodiment" mentioned in the whole specification means that particular features, structures, or characteristics related to the embodiment are included in at least one embodiment of the present application. Therefore, "in an embodiment" or "in an embodiment" appearing throughout the specification does not refer to a same embodiment. In addition, these particular features, structures, or characteristics may be combined in one or more embodiments by using any appropriate manner.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

In addition, the terms "system" and "network" may be used interchangeably in this specification. It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for inter prediction of a current image block, for use in an image encoding and/or an image decoding, the method comprising:
    determining, by an image encoder and/or an image decoder, a candidate affine block, wherein the candidate affine block is an affine coded block that is spatially neighboring to the current image block;
    obtaining candidate motion vectors (MVs) of at least two control points of the current image block by interpolation according to motion vectors of at least two control points of the candidate affine block; and
    performing prediction of the current image block, based on the candidate MVs of the at least two control points of the current image block.

2. The method according to claim 1, wherein the performing prediction of the current image block, based on the candidate MVs of the at least two control points of the current image block, comprises:
    obtaining a motion vector of each basic motion compensation unit of the current image block by interpolation according to the candidate MVs of the at least two control points of the current image block;
    obtaining predicted values of each basic motion compensation unit of the current image block through motion compensation according to reference frame information of the current image block and the motion vector of each basic motion compensation unit of the current image block; and
    obtaining predicted values of the current image block by using the predicted values of each basic motion compensation unit of the current image block.

3. The method according to claim 2, wherein the reference frame information of the current image block is same as reference frame information of the candidate affine block.

4. The method according to claim 1, wherein the candidate MVs of the at least two control points of the current image block correspond to the candidate affine block or an index.

5. The method according to claim 1, wherein the obtaining candidate MVs of at least two control points of the current image block comprises:
    obtaining candidate MVs of three control points of the current image block by interpolation according to motion vectors of three control points of the candidate affine block, when a 6-parameter affine model is used for the current image block; or
    obtaining candidate MVs of two control points of the current image block by interpolation according to motion vectors of two control points of the candidate affine block, when a 4-parameter affine model is used for the current image block.

6. The method according to claim 1, wherein the obtaining candidate MVs of at least two control points of the current image block comprises:
    obtaining candidate MVs of at least two control points of the current image block by interpolation according to motion vectors of at least two control points of the candidate affine block and a width and a height of the candidate affine block.

7. The method according to claim 6, wherein the width and the height of the candidate affine block are associated with position coordinates of the at least two control points of the candidate affine block.

8. The method according to claim 1, wherein the candidate affine block is a rectangular block, and the control points of the candidate affine block comprise two or more of: an upper left corner point, an upper right corner point, a lower left corner point, and a lower right corner point of the candidate affine block.

9. The method according to claim 1, wherein the current image block is a rectangular block, and the control points of the current image block comprises two or more of: an upper left corner point, an upper right corner point, a lower left corner point, and a lower right corner point of the current image block.

10. A method for inter prediction of a current image block, for use in an image decoding, the method comprising:
determining, by an image decoder, a candidate affine block, wherein the candidate affine block is an affine coded block that is spatially neighboring to the current image block;
obtaining candidate motion vector predictors (MVPs) of at least two control points of the current image block by interpolation according to motion vectors of at least two control points of the candidate affine block;
obtaining, from a bistream, motion vector differences (MVDs) of the at least two control points of the current image block;
deriving, based on the candidate MVPs of the at least two control points of the current image block and the MVDs of the at least two control points of the current image block, motion vectors (MVs) of the at least two control points of the current image block; and
performing prediction of the current image block, based on the MVs of the at least two control points of the current image block.

11. The method according to claim 10, the performing prediction of the current image block, based on the MVs of the at least two control points of the current image block comprises:
obtaining a motion vector of each basic motion compensation unit of the current image block by interpolation according to the MVs of the at least two control points of the current image block;
obtaining predicted values of each basic motion compensation unit of the current image block through motion compensation according to reference frame information of the current image block and the motion vector of each basic motion compensation unit of the current image block; and
obtaining predicted values of the current image block by using the predicted values of each basic motion compensation unit of the current image block.

12. The method according to claim 11, wherein the reference frame information of the current image block is parsed from the bitstream.

13. The method according to claim 10, wherein the candidate MVPs of the at least two control points of the current image block corresponds to the candidate affine block or an index.

14. The method according to claim 10, wherein the obtaining candidate MVPs of at least two control points of the current image block comprises:

obtaining candidate MVPs of at least two control points of the current image block by interpolation according to motion vectors of three control points of the candidate affine block, when a 6-parameter affine model is used for the current image block; or
obtaining candidate MVPs of at least two control points of the current image block by interpolation according to motion vectors of two control points of the candidate affine block, when a 4-parameter affine model is used for the current image block.

15. The method according to claim 10, wherein the obtaining candidate MVPs of at least two control points of the current image block, comprises:
obtaining candidate MVPs of at least two control points of the current image block by interpolation according to motion vectors of at least two control points of the candidate affine block and a width and a height of the candidate affine block.

16. The method according to claim 15, wherein the width and the height of the candidate affine block are associated with position coordinates of the at least two control points of the candidate affine block.

17. The method according to claim 10, wherein the candidate affine block is a rectangular block, and the control points of the candidate affine block comprises two or more of an upper left corner point, an upper right corner point, a lower left corner point, and a lower right corner point of the candidate affine block.

18. The method according to claim 10, wherein the current image block is a rectangular block, and the control points of the current image block comprises two or more of an upper left corner point, an upper right corner point, a lower left corner point, and a lower right corner point of the current image block.

19. An image prediction device, for use in an image encoder and/or an image decoder, comprising:
a memory storing instructions; and
a processor coupled to the memory to execute the instructions so as to configure the processor to:
determine a candidate affine block, wherein the candidate affine block is an affine coded block that is spatially neighboring to a current image block;
obtain candidate motion vectors (MVs) of at least two control points of the current image block by interpolation according to motion vectors of at least two control points of the candidate affine block; and
perform prediction of the current image block, based on the candidate MVs for the at least two control points of the current image block.

20. The device according to claim 19, wherein the processor is configured to:
obtain a motion vector of each basic motion compensation unit of the current image block by interpolation according to the candidate MVs for the at least two control points of the current image block; and
obtain predicted values of each basic motion compensation unit of the current image block through motion compensation according to reference frame information of the current image block and the motion vector of each basic motion compensation unit of the current image block; and
obtain predicted values of the current image block by using the predicted values of each basic motion compensation unit of the current image block.

21. The device according to claim 20, wherein the reference frame information of the current image block is same as reference frame information of the candidate affine block.

22. The device according to claim 19, wherein the candidate MVs of the at least two control points of the current image block corresponds to the candidate affine block or an index.

23. The device according to claim 19, wherein the processor is configured to:
obtain candidate MVs of three control points of the current image block by interpolation according to motion vectors of three control points of the candidate affine block, when a 6-parameter affine model is used for the current image block; or
obtain candidate MVs of two control points of the current image block by interpolation according to motion vectors of two control points of the candidate affine block, when a 4-parameter affine model is used for the current image block.

24. The device according to claim 19, wherein the processor is configured to:
obtain candidate MVs of at least two control points of the current image block by interpolation according to motion vectors of at least two control points of the candidate affine block and a width and a height of the candidate affine block.

25. The device according to claim 24, wherein the width and the height of the candidate affine block are associated with position coordinates of the at least two control points of the candidate affine block.

26. The device according to claim 19, wherein the candidate affine block is a rectangular block, and the control points of the candidate affine block comprises two or more of an upper left corner point, an upper right corner point, a lower left corner point, and a lower right corner point of the candidate affine block.

27. The device according to claim 19, wherein the current image block is a rectangular block, and the control points of the current image block comprises two or more of an upper left corner point, an upper right corner point, a lower left corner point, and a lower right corner point of the current image block.

28. The device according to claim 19, wherein the processor is further configured to:
obtain a motion vector of each basic motion compensation unit of the current image block by interpolation according to the motion vectors of the at least two control points of the current image block; and
obtain predicted values of each basic motion compensation unit of the current image block through motion compensation according to reference frame information of the current image block and the motion vector of each basic motion compensation unit of the current image block; and
obtain predicted values of the current image block by using the predicted values of each basic motion compensation unit of the current image block.

29. The device according to claim 26, wherein the reference frame information of the current image block is same as reference frame information of the candidate affine block.

30. An image prediction device, for use in an image decoder, comprising:
a memory storing instructions; and
a processor coupled to the memory to execute the instructions so as to configure the processor to:
determine a candidate affine block, wherein the candidate affine block is an affine coded block that is spatially neighboring to a current image block;
obtain candidate motion vector predictors (MVPs) of at least two control points of the current image block by interpolation according to motion vectors of at least two control points of the candidate affine block;
obtain, from a bistream, motion vector differences (MVDs) of the at least two control points of the current image block;
derive, based on the candidate MVPs of the at least two control points of the current image block and the MVDs of the at least two control points of the current image block, motion vectors (MVs) of the at least two control points of the current image block; and
perform prediction of the current image block, based on the MVs of the at least two control points of the current image block.

31. The device according to claim 30, wherein the processor is configured to:
obtain a motion vector of each basic motion compensation unit of the current image block by interpolation according to the motion vectors of the at least two control points of the current image block;
obtain predicted values of each basic motion compensation unit of the current image block through motion compensation according to reference frame information of the current image block and the motion vector of each basic motion compensation unit of the current image block; and
obtain predicted values of the current image block by using the predicted values of each basic motion compensation unit of the current image block.

32. The device according to claim 31, wherein the reference frame information of the current image block is parsed from the bitstream.

33. The device according to claim 30, wherein the candidate MVPs of the at least two control points of the current image block corresponds to the candidate affine block or an index.

34. The device according to claim 30, wherein the processor is configured to:
obtaining candidate MVPs of at least two control points of the current image block by interpolation according to motion vectors of three control points of the candidate affine block, when a 6-parameter affine model is used for the current image block; or
obtaining candidate MVPs of at least two control points of the current image block by interpolation according to motion vectors of two control points of the candidate affine block, when a 4-parameter affine model is used for the current image block.

35. The device according to claim 30, wherein the processor is configured to:
obtain candidate MVPs of at least two control points of the current image block by interpolation according to motion vectors of at least two control points of the candidate affine block and a width and a height of the candidate affine block.

36. The device according to claim 35, wherein the width and the height of the candidate affine block are associated with position coordinates of the at least two control points of the candidate affine block.

37. The device according to claim 30, wherein the candidate affine block is a rectangular block, and the control points of the candidate affine block comprises two or more of an upper left corner point, an upper right corner point, a lower left corner point, and a lower right corner point of the candidate affine block.

38. The device according to claim 30, wherein the current image block is a rectangular block, and the control points of the current image block comprises two or more of an upper left corner point, an upper right corner point, a lower left corner point, and a lower right corner point of the current image block.

* * * * *